United States Patent
Patel et al.

(10) Patent No.: US 11,926,421 B2
(45) Date of Patent: Mar. 12, 2024

(54) PASSENGER SEAT ARMREST ASSEMBLY

(71) Applicant: The Boeing Company, Chicago, IL (US)

(72) Inventors: Amar Patel, Karnataka (IN); Niraj Moreshwar Bhaktwarti, Karnataka (IN); Vijay Singh Rathore, Karnataka (IN); Praveen Varma, Karnataka (IN)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/885,691

(22) Filed: Aug. 11, 2022

(65) Prior Publication Data
US 2024/0051664 A1    Feb. 15, 2024

(51) Int. Cl.
*B64D 11/06*    (2006.01)

(52) U.S. Cl.
CPC ................ *B64D 11/0644* (2014.12)

(58) Field of Classification Search
CPC ................................... B64D 11/0644
USPC .................................... 297/411.35
See application file for complete search history.

(56) References Cited

U.S. PATENT DOCUMENTS

| | | | |
|---|---|---|---|
| 6,045,191 A * | 4/2000 | Piretti | A47C 1/0308 297/411.37 |
| 8,931,846 B2 | 1/2015 | Merensky | |
| 9,630,720 B2 | 4/2017 | Saint-Jalmes | |
| 10,104,972 B2 | 10/2018 | Cummins | |
| 10,953,777 B1 | 3/2021 | Rathore et al. | |
| 2009/0206647 A1* | 8/2009 | Wieczorek | B60N 2/773 297/411.37 |
| 2014/0217798 A1* | 8/2014 | Negusse | 297/411.3 |
| 2023/0120497 A1* | 4/2023 | Shivalinga | 244/118.1 |

FOREIGN PATENT DOCUMENTS

| | | |
|---|---|---|
| CN | 106275450 A | 1/2017 |
| CN | 114348273 A | 4/2022 |
| JP | 2017006565 A | 1/2017 |

OTHER PUBLICATIONS

EP Search Report dated Dec. 7, 2023 in re EP Application No. 23182993.8.

* cited by examiner

*Primary Examiner* — Anthony D Barfield
(74) *Attorney, Agent, or Firm* — COATS & BENNETT, PLLC

(57) ABSTRACT

An armrest assembly comprising a secondary armrest assembly is disclosed that can be deployed from a stowed and nested position beneath a primary armrest, with the secondary armrest assembly comprising a plurality of articulable and pivotable components, a seating assembly comprising the present armrest assembly, and vehicles configured to comprise the present armrest and seating assembly.

20 Claims, 13 Drawing Sheets

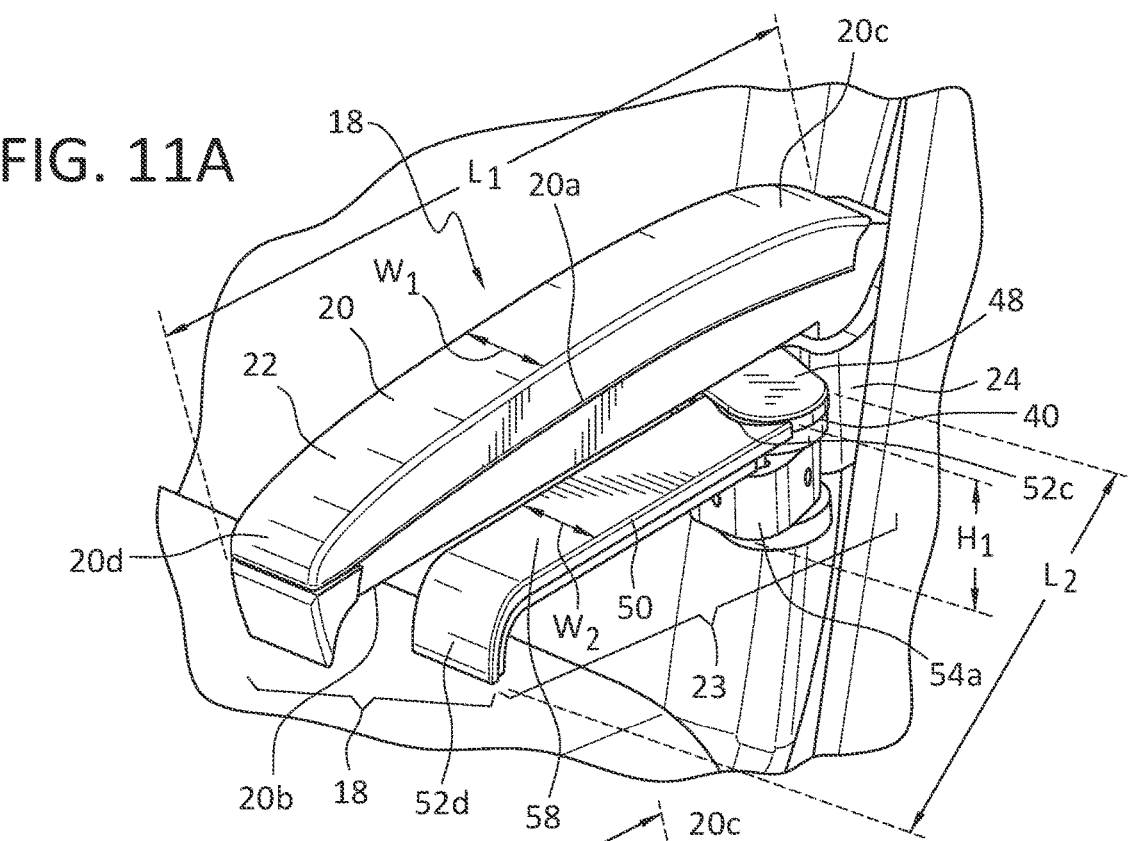
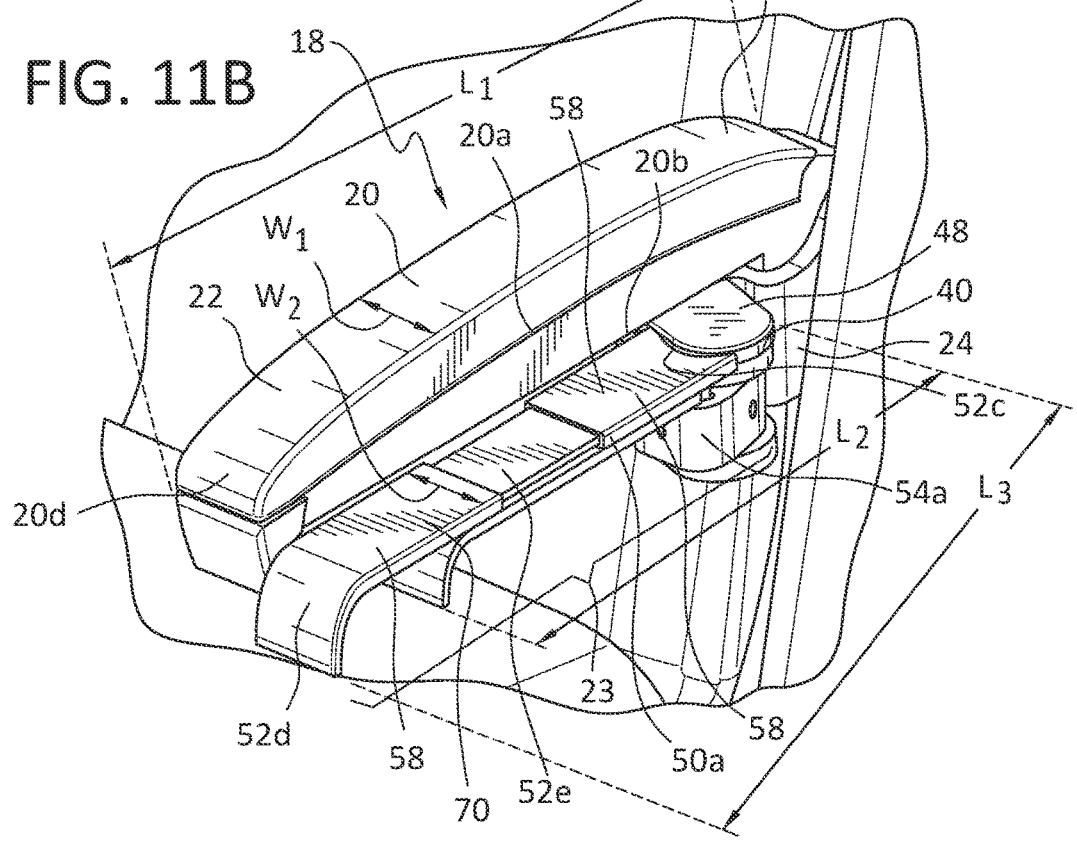

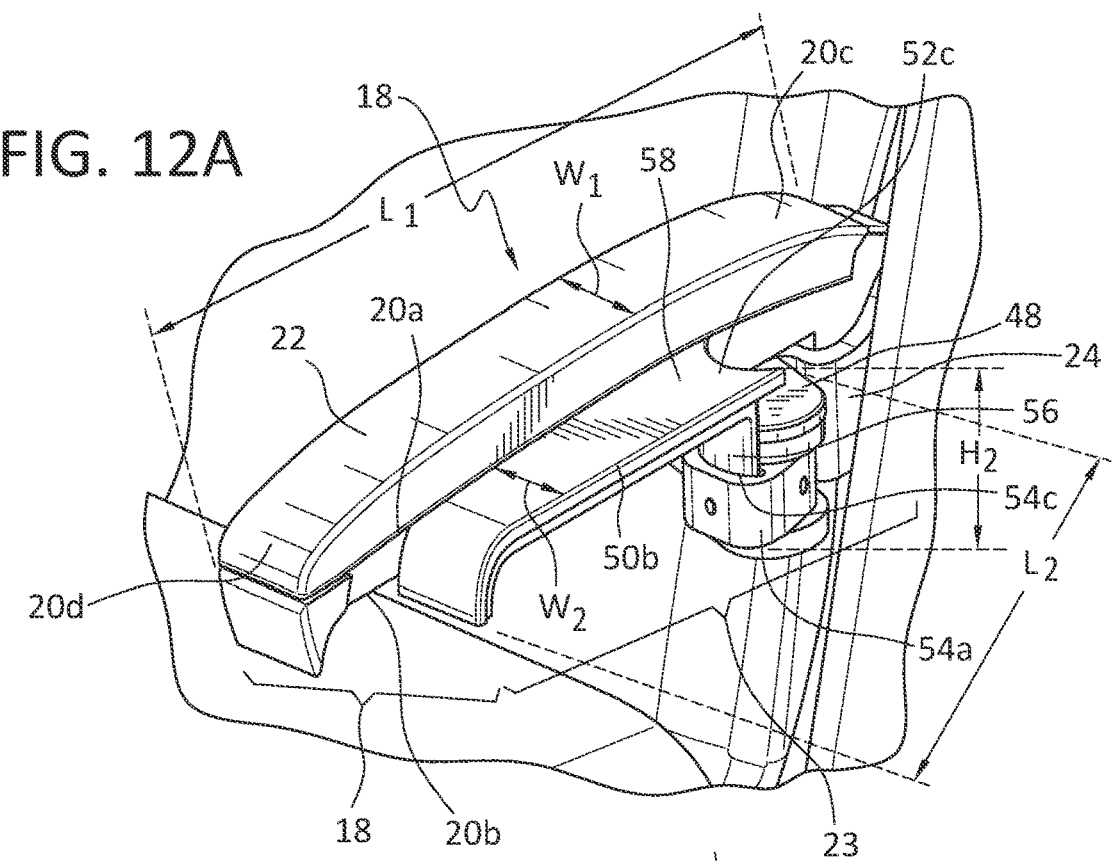
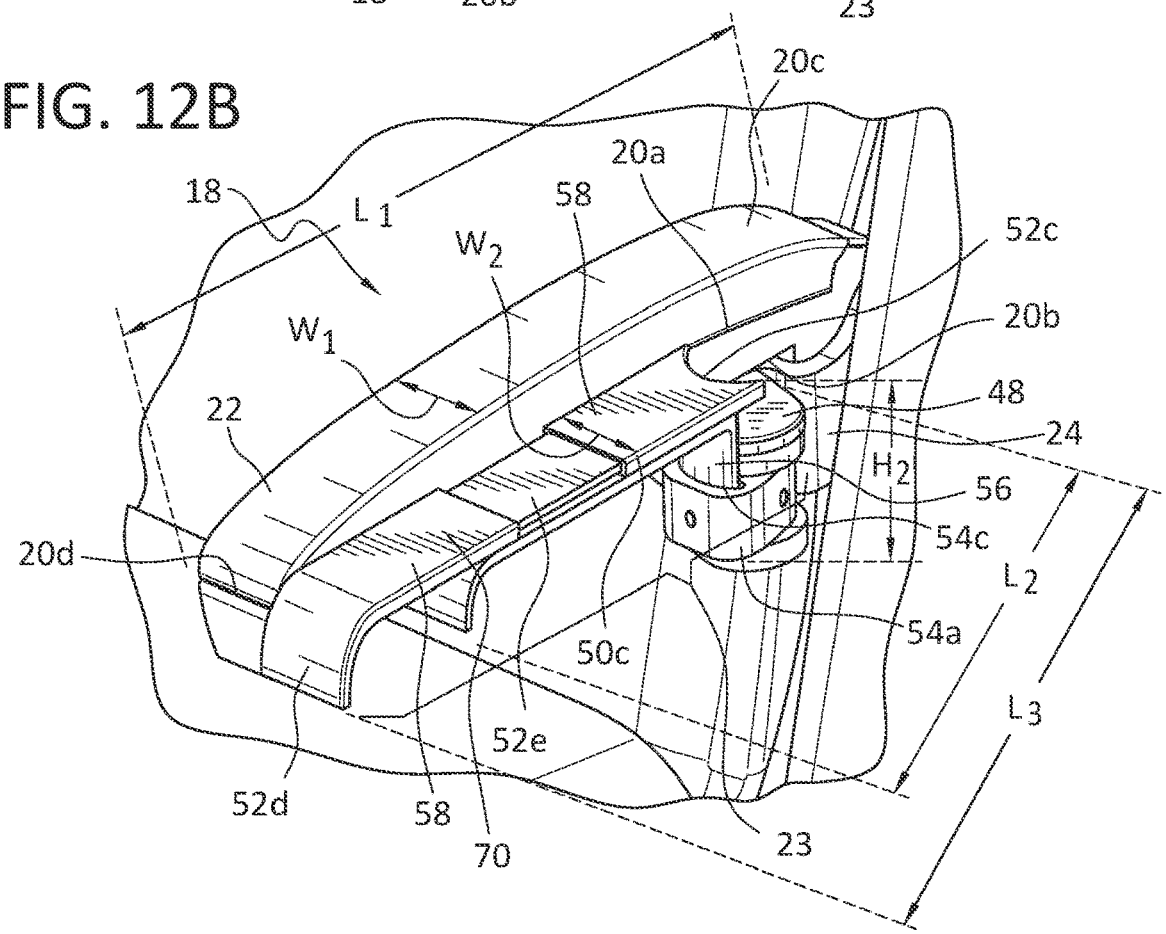

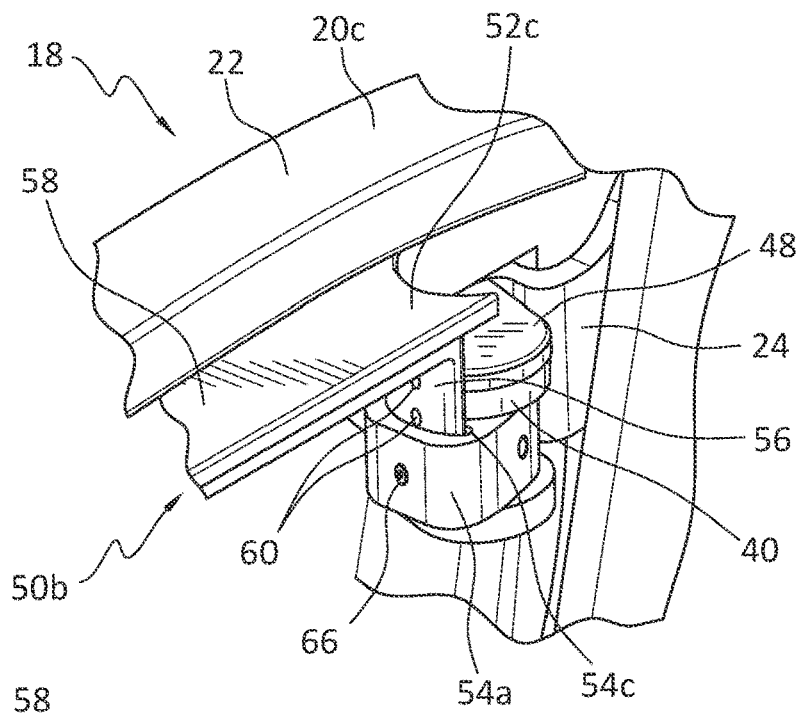
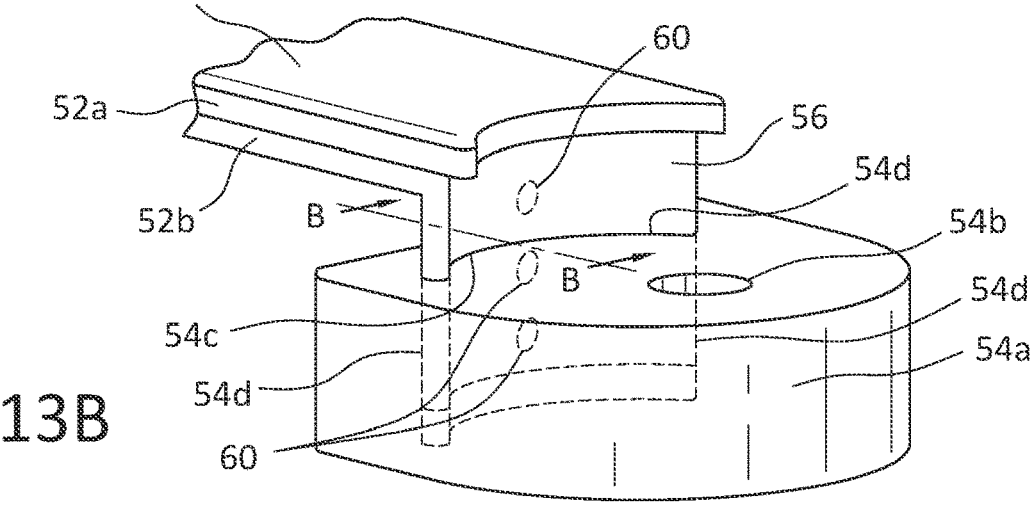
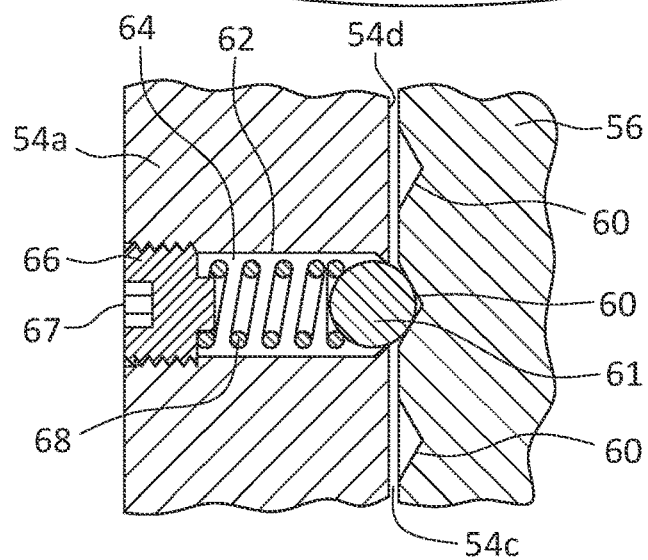

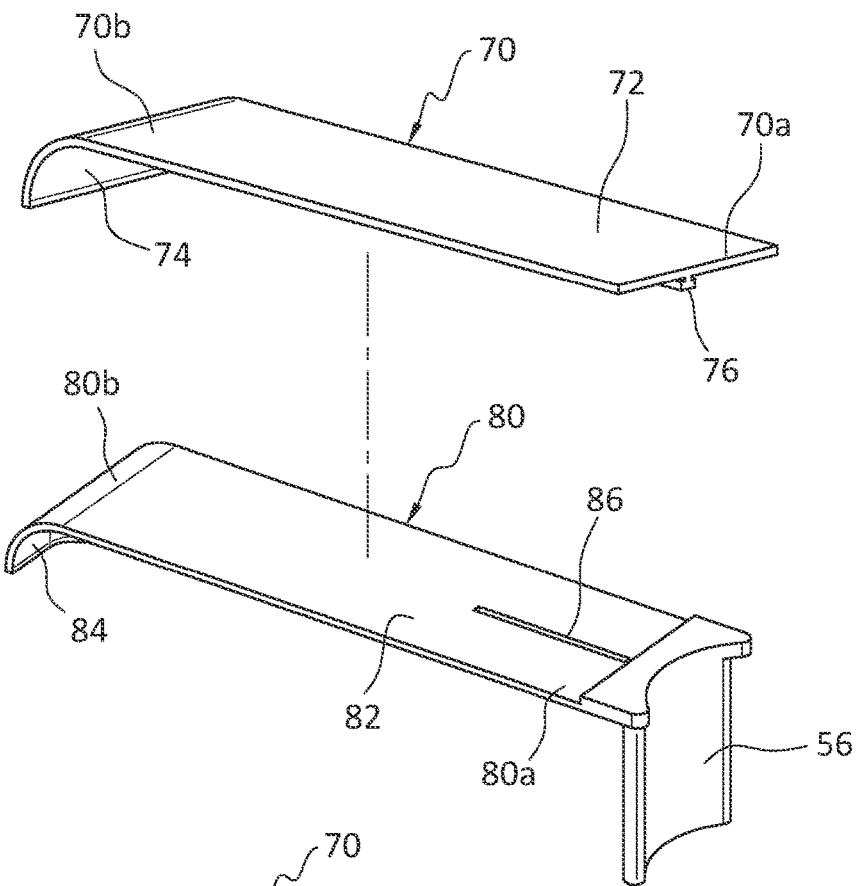
FIG. 16A
FIG. 16B
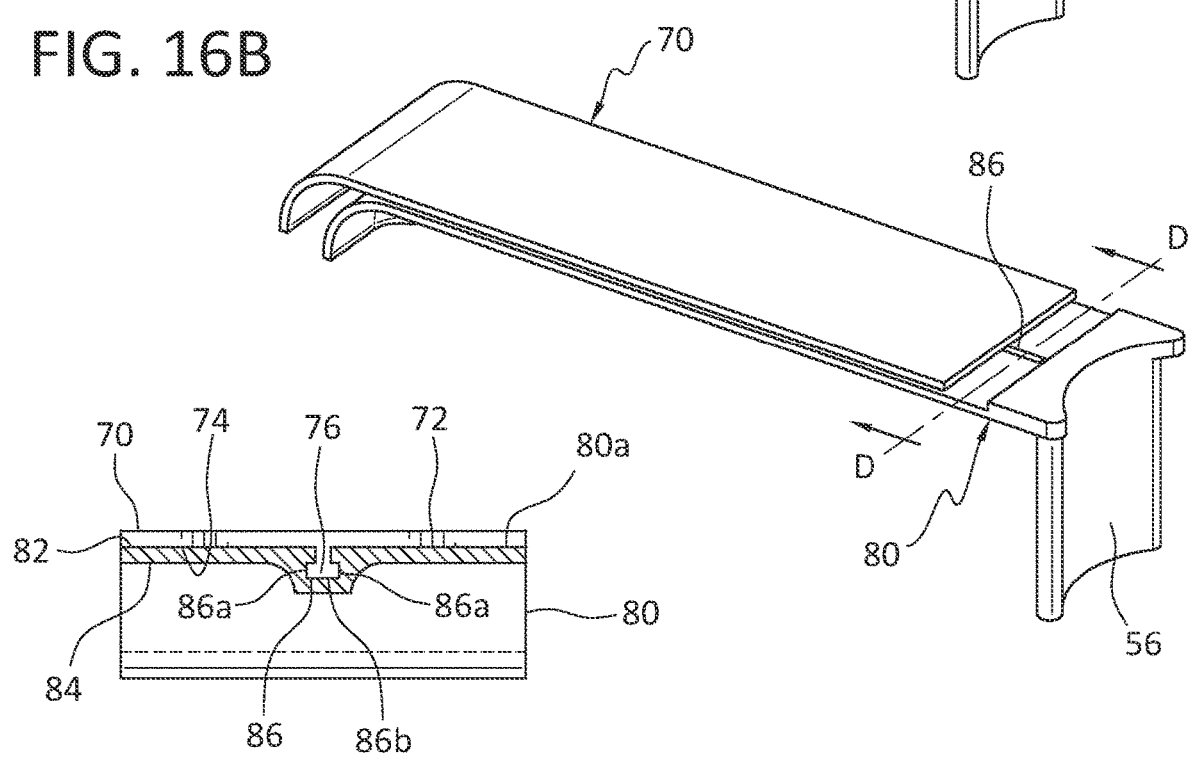
FIG. 16C

PASSENGER SEAT ARMREST ASSEMBLY

TECHNOLOGICAL FIELD

The present disclosure relates to the field of armrests, and armrest assemblies used for manufacturing seat assemblies. More specifically, the present disclosure relates to the field of armrests, and armrest assemblies used for manufacturing seat assemblies for vehicles including aircraft.

BACKGROUND

Seating designed to accommodate more than one person often includes a plurality of individual and separated, as well as adjoined seats, located next to one another. Such seating designed to accommodate a plurality of people often position armrests for convenience that can act as separators delineating the area of individual seats. Where two seats adjoin one another, a single adjoining armrest often exists to service the occupants of adjoining seats. When adjoining seats are concurrently occupied by, for example, passengers, the armrest located between adjoining passengers must be shared if the armrest is to be used by both passengers. Such a shared armrest called upon to concurrently service adjoining passengers has been found to inadequately serve the needs of adjoining passengers.

Unless explicitly identified as such, no statement herein is admitted as prior art merely by its inclusion in the Technological Field and/or Background section.

SUMMARY

Present aspects are directed to an armrest assembly, with the armrest assembly including a primary armrest assembly. The primary armrest assembly includes a primary armrest assembly first surface (e.g., an upper surface) and a primary armrest assembly secondary (lower) surface (e.g., a lower surface), with the primary armrest assembly comprising a primary armrest proximal end and a primary armrest distal end, with the primary armrest proximal end in communication with a seat assembly. The armrest assembly further includes a secondary armrest assembly, with the secondary armrest assembly including a secondary armrest front link. The secondary armrest front link includes a secondary armrest front link first surface (e.g., an upper surface) and a secondary armrest front link second surface (e.g., a lower surface), with the secondary armrest front link further including a secondary armrest front link proximal end and a secondary armrest front link distal end. The secondary armrest front link proximal end includes a secondary armrest front link proximal end flange, and the secondary armrest front link proximal end flange includes a secondary armrest front link proximal end flange through opening. The secondary armrest assembly further includes a secondary armrest intermediate link, with the secondary armrest intermediate link including a secondary armrest intermediate link proximal end and a secondary armrest intermediate link distal end, and with the secondary armrest intermediate link distal end including a secondary armrest intermediate link distal end flange configured to movably and pivotably engage the secondary armrest front link proximal end flange.

According to present aspects, the armrest assembly further includes an armrest assembly end link, with the armrest assembly end link including an armrest assembly end link proximal end and an armrest assembly end link distal end, and with the armrest assembly end link distal end configured to movably and pivotably engage the secondary armrest intermediate link proximal end flange, and with the armrest assembly end link proximal end configured to engage or otherwise be in communication with a t least one of a seat frame, a seat assembly component, and a seat assembly.

In another aspect, the secondary armrest assembly is configured to move from a secondary armrest assembly stowed position located immediately beneath the primary armrest assembly and within a dimensional footprint of the primary armrest assembly, to a secondary armrest assembly deployed position located laterally adjacent to the primary armrest assembly (e.g. the secondary armrest assembly in the deployed position is moved "out from under" the primary armrest assembly, and outside of or beyond the dimensional footprint of the primary armrest assembly such that the secondary armrest assembly is exposed.

In another aspect the primary armrest assembly has a first average width (W1) along a longitudinal axis of the primary armrest assembly, and the secondary armrest front link has a second average width (W2) along a longitudinal axis of the secondary armrest assembly, with the first average width (W1) greater than or equal to the second average width (W2).

In another aspect, the secondary armrest assembly in the stowed position is configured to movably nest beneath and immediately adjacent to the primary armrest assembly.

In a further aspect, the secondary armrest assembly further includes a secondary armrest front link length extender, with the secondary armrest front link length extender configured to extend outwardly to a selected extended distance from the secondary armrest front link distal end.

In a further aspect, the secondary armrest front link length extender can be an extendable nested member that can extend from and retract to a secondary armrest front link length extender first position in the secondary armrest assembly to a secondary armrest front link length extender second position in the secondary armrest assembly.

In another aspect, the secondary armrest front link first surface comprises a secondary armrest front link first surface area, and wherein the entirety of the secondary armrest front link first surface area is exposed in the secondary armrest assembly deployed position.

In a further aspect, the secondary armrest front link first surface includes a secondary armrest cushion layer first section, with the intermediate link including a secondary armrest cushion layer second section, and with the primary armrest assembly first surface including a primary armrest assembly cushion layer.

In another aspect, in the secondary armrest assembly deployed position, the secondary armrest cushion layer first section is positioned at a secondary armrest cushion layer first section relative height, with the secondary armrest cushion layer first section relative height varying from a primary armrest assembly cushion layer relative height.

In another aspect, the intermediate link proximal end is configured to movably engage with the end link distal end, and with the intermediate link configured to movably pivot horizontally about the end link distal end.

In another aspect, the secondary armrest front link proximal end is configured to movably and pivotably engage with the intermediate link distal end, with the secondary armrest front link further configured to movably pivot horizontally about the intermediate link distal end.

A further present aspect is directed to a seat assembly, with the seat assembly including an armrest assembly, with the armrest assembly including a primary armrest assembly including a primary armrest assembly first surface (e.g., an upper surface) and a primary armrest assembly second (lower) surface (e.g., a lower surface), with the primary armrest assembly further including a primary armrest proximal end and a primary armrest distal end. The armrest assembly further includes a secondary armrest assembly, with the secondary armrest assembly including a secondary armrest front link. The secondary armrest front link includes a secondary armrest front link first surface (e.g., an upper surface) and a secondary armrest front link second surface (e.g., a lower surface), with the secondary armrest front link including a secondary armrest front link proximal end and a secondary armrest front link distal end. The secondary armrest front link proximal end includes a secondary armrest front link proximal end flange, and the secondary armrest front link proximal end flange includes a secondary armrest front link proximal end flange through opening. The secondary armrest assembly further includes a secondary armrest intermediate link, with the secondary armrest intermediate link including a secondary armrest intermediate link proximal end and a secondary armrest intermediate link distal end, and with the secondary armrest intermediate link distal end including a secondary armrest intermediate link distal end flange configured to movably engage the secondary armrest front link proximal end flange. The armrest assembly further includes an armrest assembly end link, with the armrest assembly end link including an armrest assembly end link proximal end and an armrest assembly end link distal end, and with the armrest assembly end link distal end configured to movably engage the secondary armrest intermediate link proximal end flange, and with the armrest assembly end link proximal end configured to engage at least one of a seat frame, a seat frame component, and a seat assembly.

Further present aspects are directed to a passenger vehicle including the seating assemblies disclosed herein.

Further present aspects are directed to a passenger vehicle including the armrest assemblies disclosed herein.

According to further present aspects, a passenger vehicle including the presently disclosed armrest assemblies is selected from the group consisting of a crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle; a crewed surface water borne vehicle, an uncrewed waterborne vehicle, a crewed sub-surface water borne vehicle, an uncrewed sub-surface water borne vehicle, and combinations thereof.

Still further aspects are directed to aircraft, that can include passenger aircraft comprising the presently disclosed armrest assemblies.

Still further aspects are directed to aircraft, that can include passenger aircraft comprising the presently disclosed seating assemblies According to further present aspects, a secondary armrest assembly is presently disclosed, with the secondary armrest assembly including a secondary armrest front link, and with the secondary armrest front link comprising a secondary armrest front link first surface (e.g., secondary armrest front link upper surface) and a secondary armrest front link second surface (e.g., secondary armrest front link lower surface), with the secondary armrest front link including a secondary armrest front link proximal end and a secondary armrest front link distal end, and with the secondary armrest front link proximal end comprising a secondary armrest front link proximal end flange, and with the secondary armrest front link proximal end flange comprising a secondary armrest front link proximal end flange through opening. The secondary armrest assembly further includes a secondary armrest intermediate link, with the secondary armrest intermediate link including a secondary armrest intermediate link proximal end and a secondary armrest intermediate link distal end, with the secondary armrest intermediate link distal end including a secondary armrest intermediate link distal end flange configured to movably and pivotably engage the secondary armrest front link proximal end flange. According to present aspects, the secondary armrest assembly is configured to move from a secondary armrest assembly stowed position to a secondary armrest assembly deployed position.

In another aspect, the secondary armrest assembly is in communication with an armrest assembly end link, with the armrest assembly end link including an armrest assembly end link proximal end and an armrest assembly end link distal end, with the armrest assembly end link distal end configured to movably and pivotably engage the secondary armrest intermediate link proximal end flange, and with the armrest assembly end link proximal end configured to engage at least one of a seat frame, a seat frame component, and a seat assembly.

In another aspect, the secondary armrest assembly in the stowed position is configured and dimensioned to movably and/or pivotably nest beneath a primary armrest assembly.

In another aspect, the secondary armrest assembly further includes a secondary armrest front link extender, with the secondary armrest front link extender configured to extend to a selected distance outwardly from the secondary armrest front link distal end in an extended configuration that is different from and great than secondary armrest front link extender initial position (e.g., a non-extended position) along the longitudinal axis of the secondary armrest assembly.

In another aspect, the secondary armrest front link is configured to extend vertically to a selected height in a secondary armrest front link vertically extended configuration, with the selected height in a secondary armrest front link vertically extended configuration different than a secondary armrest front link height in the secondary armrest assembly stowed configuration.

Further present aspects are directed to a seat assembly comprising the secondary armrest assembly disclosed herein.

Another present aspect is directed to a passenger vehicle including the seat assembly comprising the secondary armrest assembly disclosed herein, with the passenger vehicle selected from the group consisting of a crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle; a crewed surface water borne vehicle, an uncrewed waterborne vehicle, a crewed sub-surface water borne vehicle, an uncrewed sub-surface water borne vehicle, and combinations thereof.

Another present aspect is directed to an aircraft comprising the seat assembly comprising the secondary armrest assembly disclosed herein.

According to further present aspects, a method for installing an armrest assembly into a seat assembly is disclosed, with the method comprising providing a seat assembly comprising a seat assembly frame, with the seat assembly frame configured to support a plurality of seats, and attaching an armrest assembly to the seat assembly frame, with the armrest assembly comprising a secondary armrest front link, with the secondary armrest front link comprising a secondary armrest front link first surface (e.g., secondary armrest front link upper surface) and a secondary armrest front link second surface (e.g., secondary armrest front link lower surface), with the secondary armrest front link including a secondary armrest front link proximal end and a secondary armrest front link distal end, and with the secondary armrest front link proximal end comprising a secondary armrest front link proximal end flange, and with the secondary armrest front link proximal end flange comprising a secondary armrest front link proximal end flange through opening. The secondary armrest assembly further includes a secondary armrest intermediate link, with the secondary armrest intermediate link including a secondary armrest intermediate link proximal end and a secondary armrest intermediate link distal end, with the secondary armrest intermediate link distal end including a secondary armrest intermediate link distal end flange configured to movably and pivotably engage the secondary armrest proximal end flange, wherein the secondary armrest assembly is attached to the seat frame via an armrest assembly end link, with the armrest assembly end link comprising an armrest assembly end link proximal end and an armrest assembly end link distal end, with the armrest assembly end link distal end configured to movably engage the armrest assembly intermediate link proximal end flange, and with the armrest assembly end link proximal end configured to engage at least one of a seat assembly frame, a seat frame component, and a seat assembly.

In another aspect, a method further comprises attaching a primary armrest assembly to the armrest assembly end link, with the primary armrest assembly comprising a primary armrest assembly first surface (e.g., a primary armrest assembly upper surface) and a primary armrest assembly second surface (e.g., a primary armrest assembly lower surface), with the primary armrest assembly comprising a primary armrest proximal end and a primary armrest distal end, with the primary armrest distal end, and with the primary armrest distal end configured to engage the armrest assembly end link.

In a further aspect, a method further comprises nesting the secondary armrest assembly beneath the primary armrest assembly in a secondary armrest assembly stowed configuration.

In yet another present aspect, a method for installing a seat assembly into a passenger aircraft is disclosed, with the method comprising installing a seat assembly into a passenger vehicle, with the seat assembly comprising an armrest assembly, and with the armrest assembly comprising a primary armrest assembly. The primary armrest assembly includes a primary armrest assembly first (upper) surface and a primary armrest assembly second (lower) surface, with the primary armrest assembly comprising a primary armrest proximal end and a primary armrest distal end. The armrest assembly further comprises a secondary armrest assembly, with the secondary armrest assembly comprising a secondary armrest front link, with the secondary armrest front link comprising a secondary armrest front link first (upper) surface and a secondary armrest front link second (lower) surface. The secondary armrest front link comprises a secondary armrest front link proximal end and a secondary armrest front link distal end, with the secondary armrest front link proximal end comprising a secondary armrest front link proximal end flange, with the secondary armrest front link proximal end flange comprising a secondary armrest front link proximal end flange through opening, and with the secondary armrest assembly further comprising a secondary armrest intermediate link. The secondary armrest intermediate link comprises a secondary armrest intermediate link proximal end and a secondary armrest intermediate link distal end, with the secondary armrest intermediate link distal end comprising a secondary armrest intermediate link distal end flange configured to movably and pivotably engage the secondary armrest front link proximal end flange. The secondary armrest assembly further comprises an armrest assembly end link, with the armrest assembly end link comprising an armrest assembly end link proximal end and an armrest assembly end link distal end, with the armrest assembly end link distal end configured to movably engage the secondary armrest intermediate link proximal end flange, and with the armrest assembly end link proximal end configured to engage at least one of a seat assembly frame, a seat frame component, and a seat assembly seat frame.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
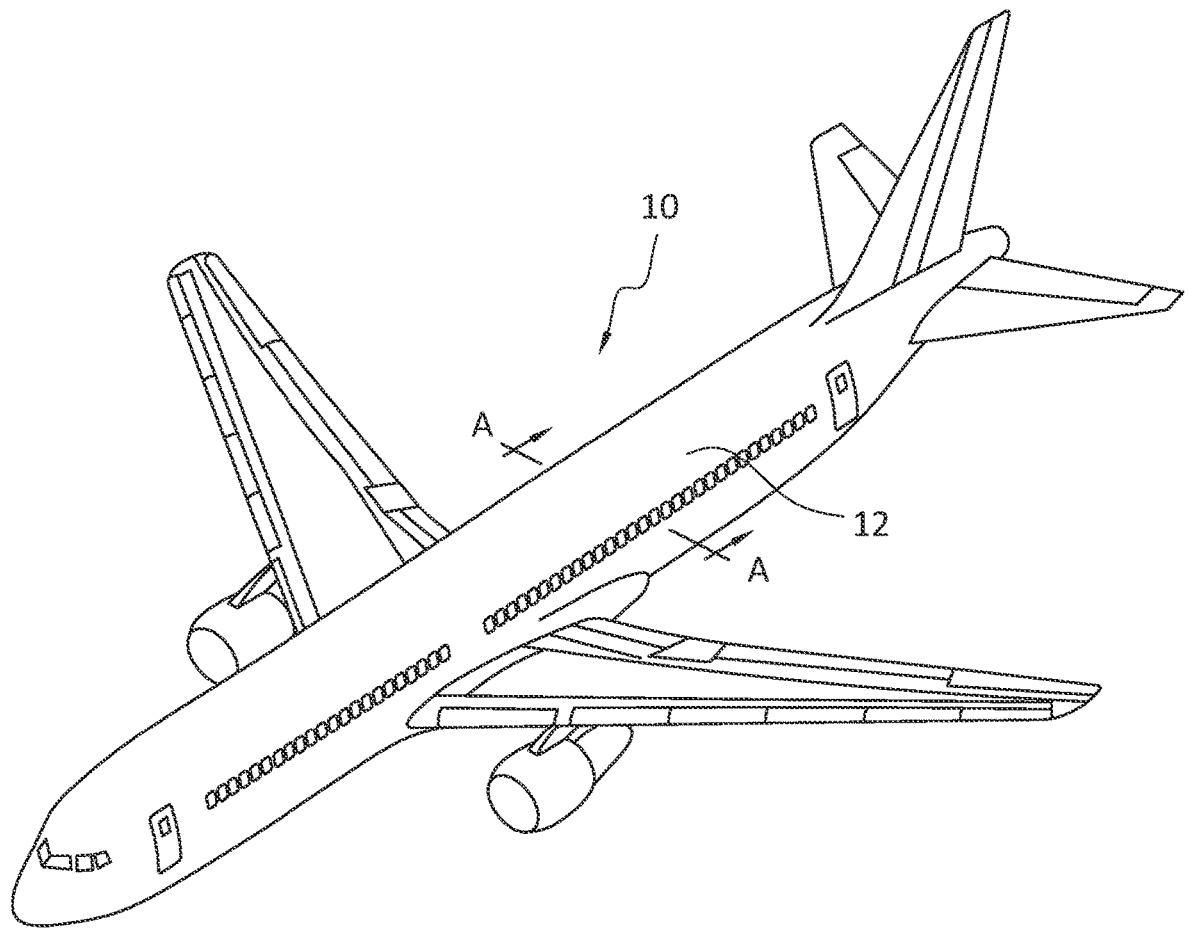
Figure 2:
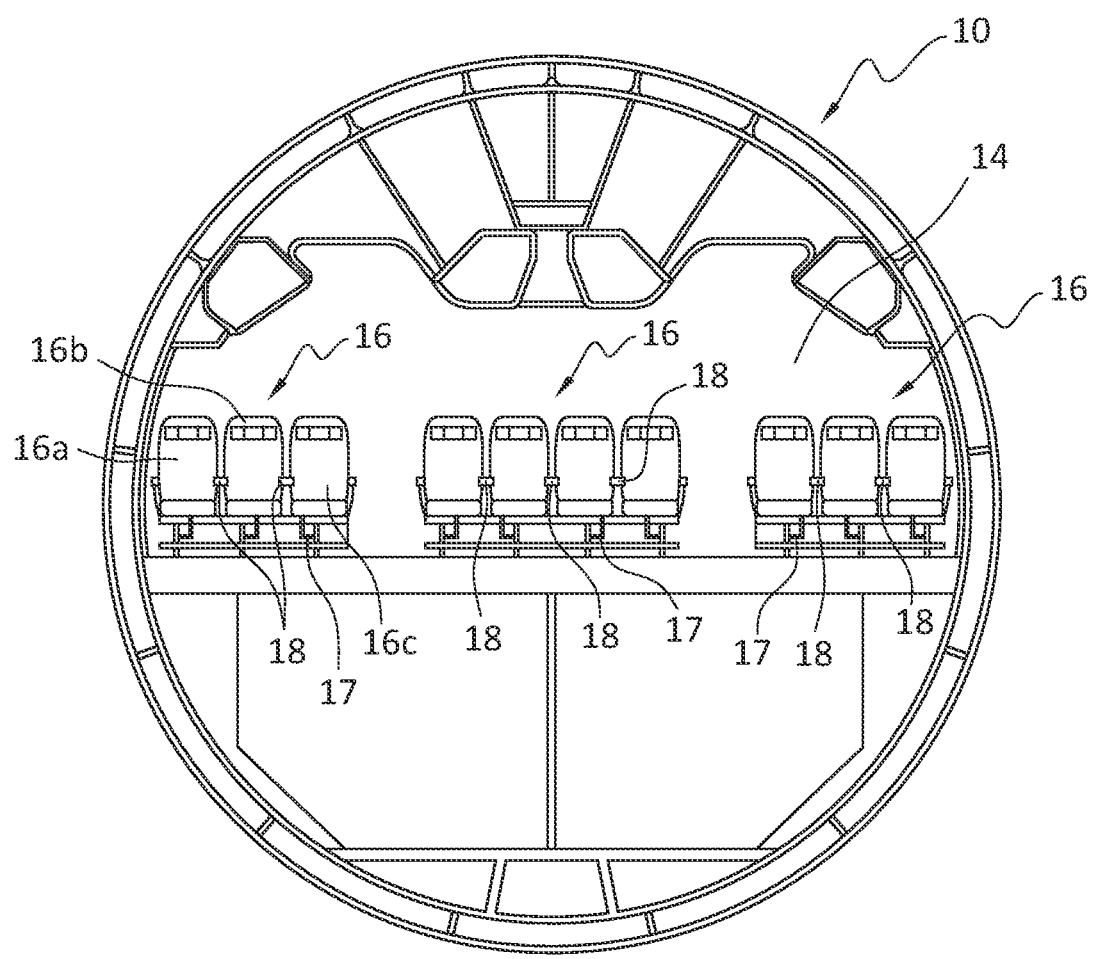
Figure 3:
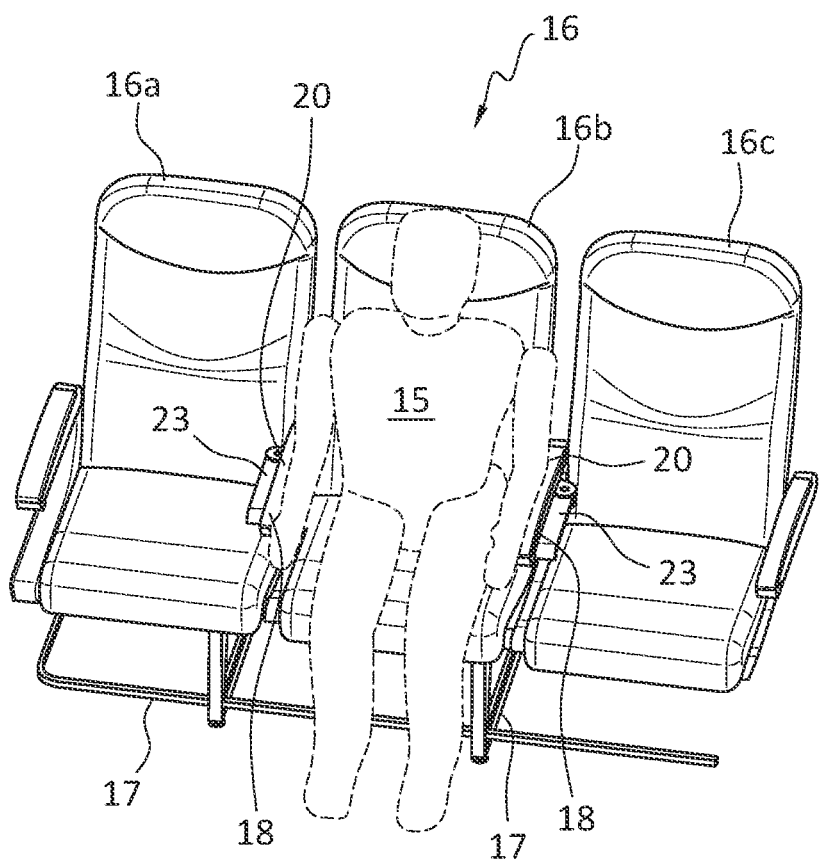
Figure 4:
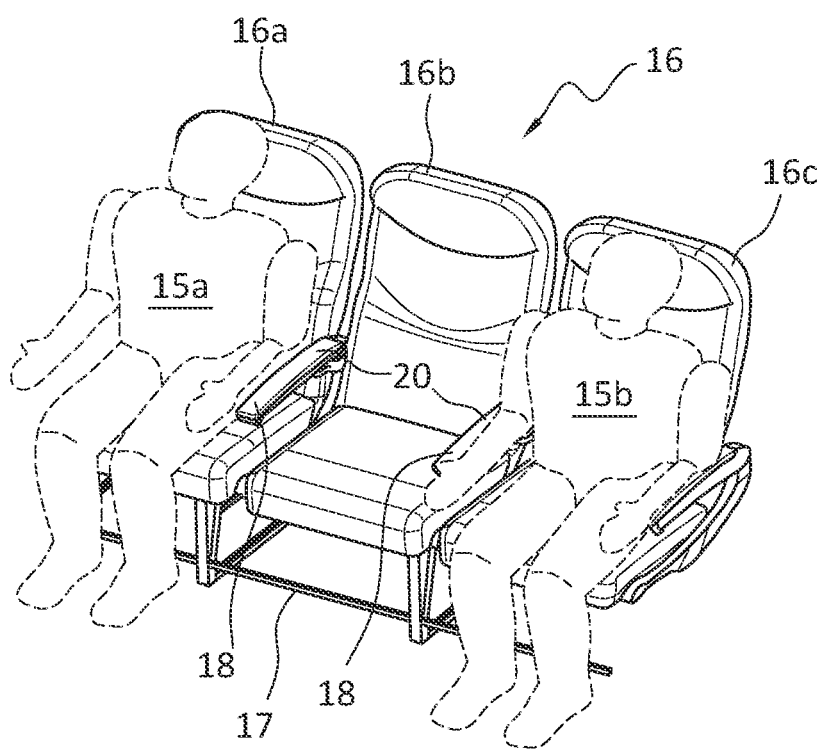
Figure 5:
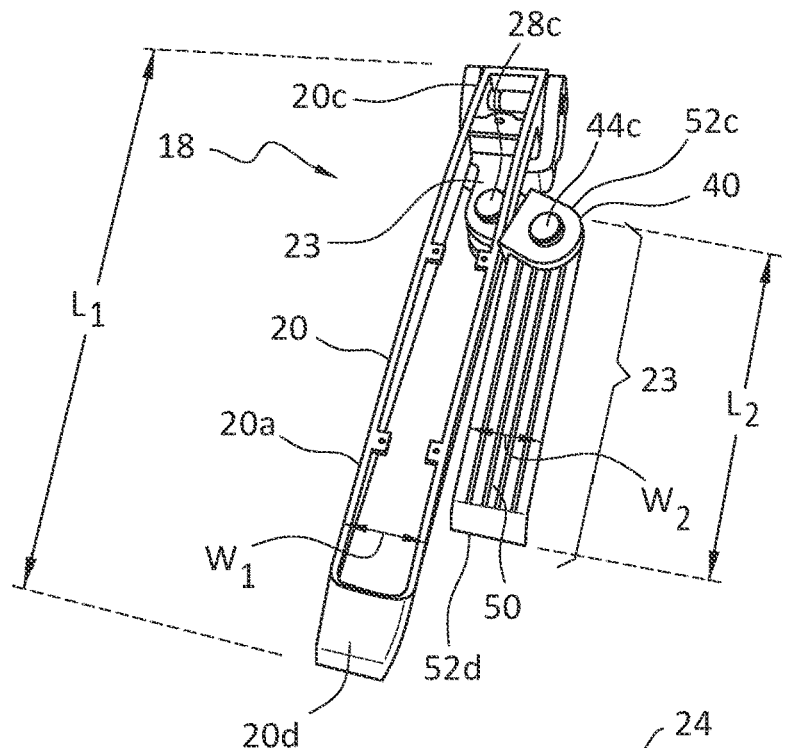
Figure 6:
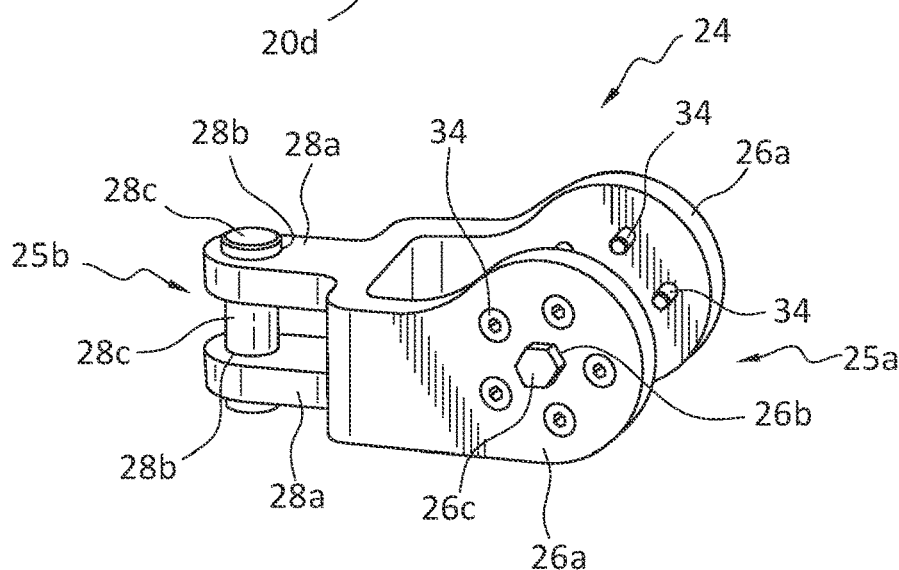
Figure 7:
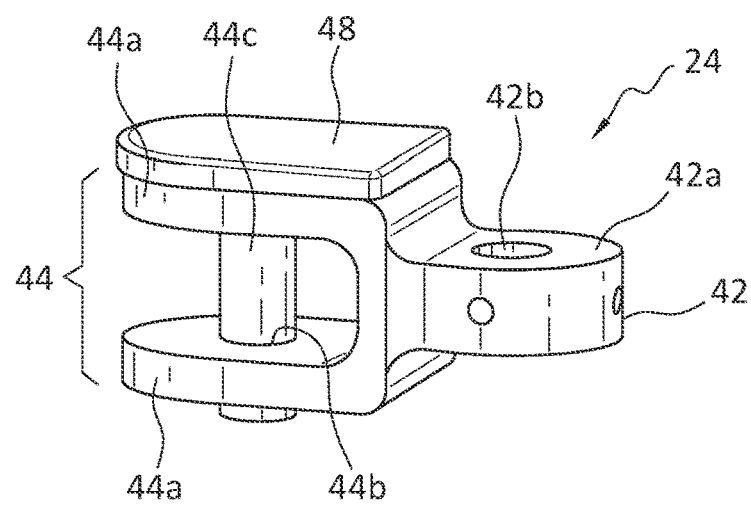
Figure 8:
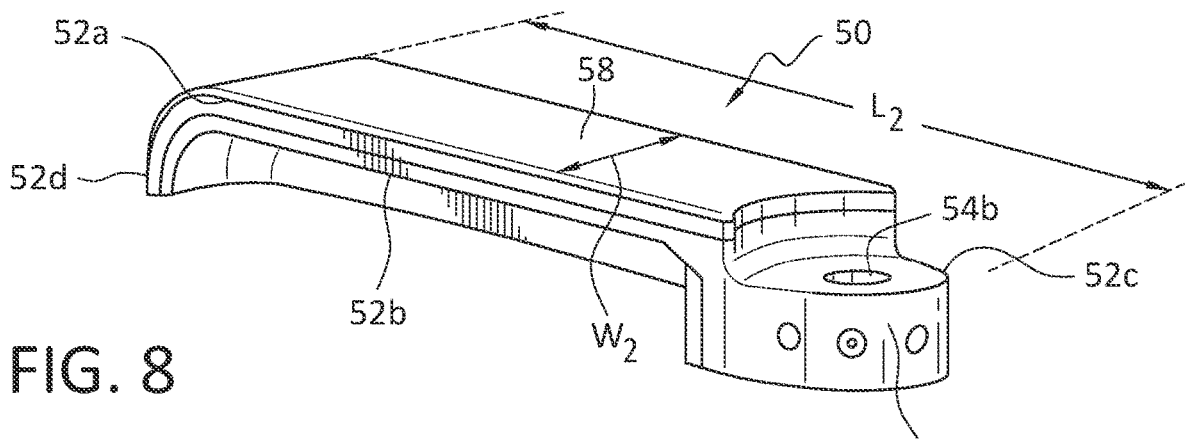
Figure 9:
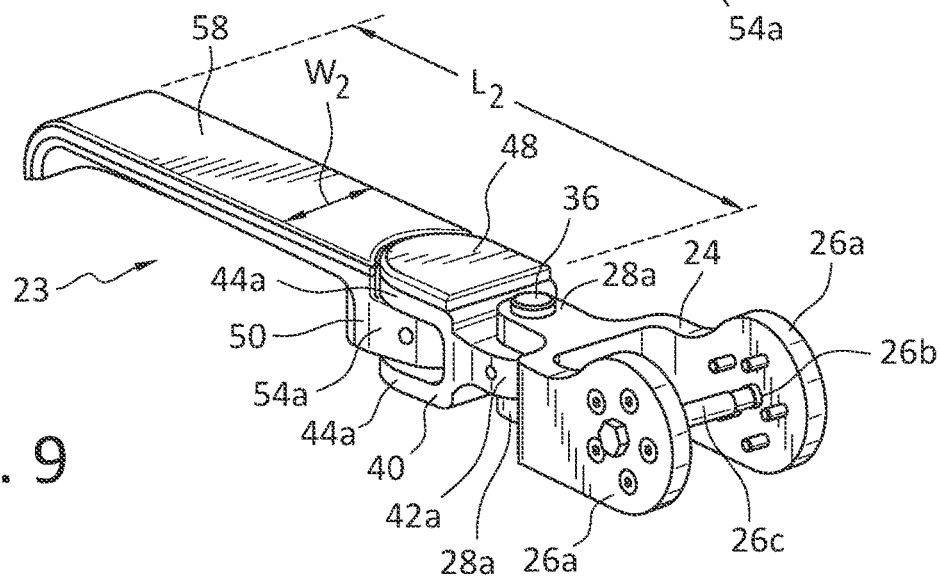
Figure 10:
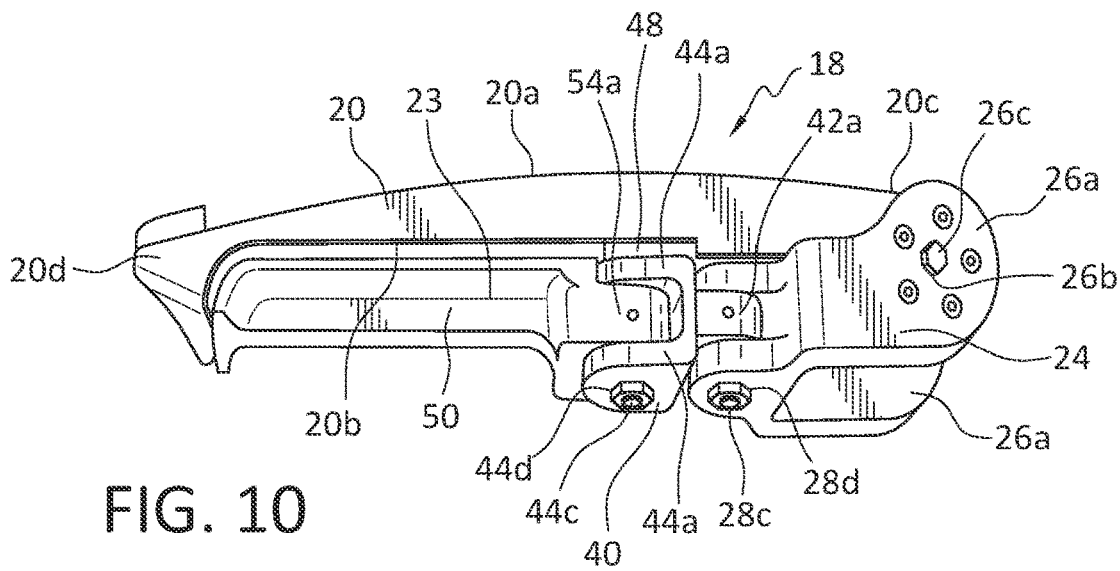
Figure 14A:
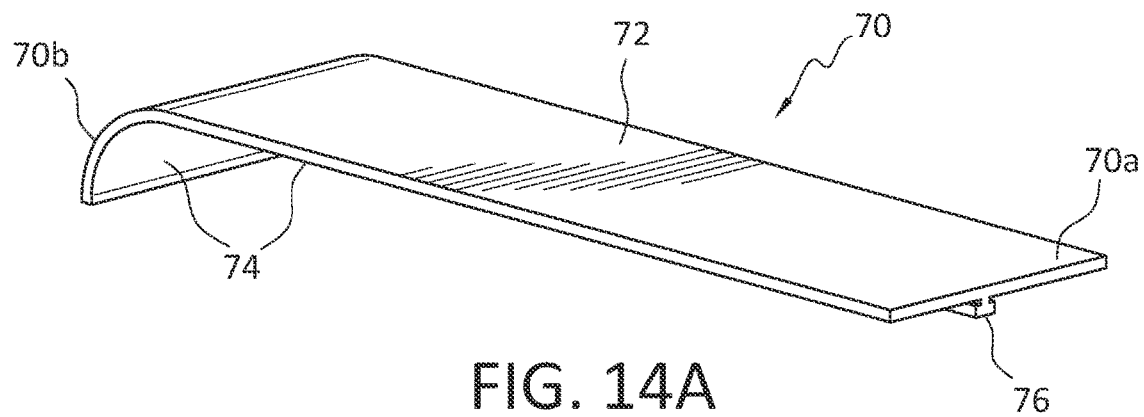
Figure 14B:
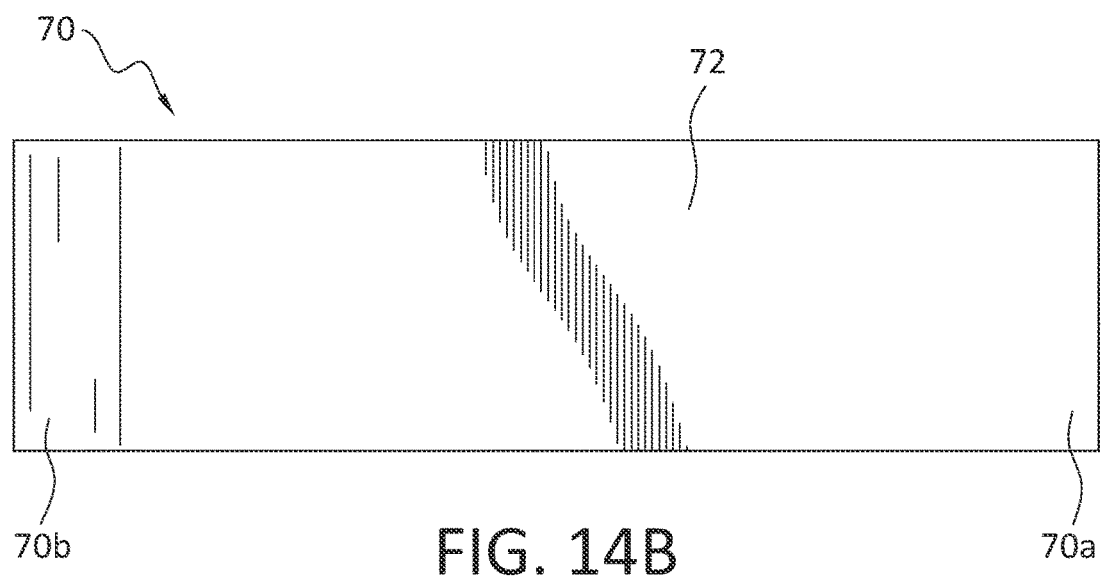
Figure 14C:
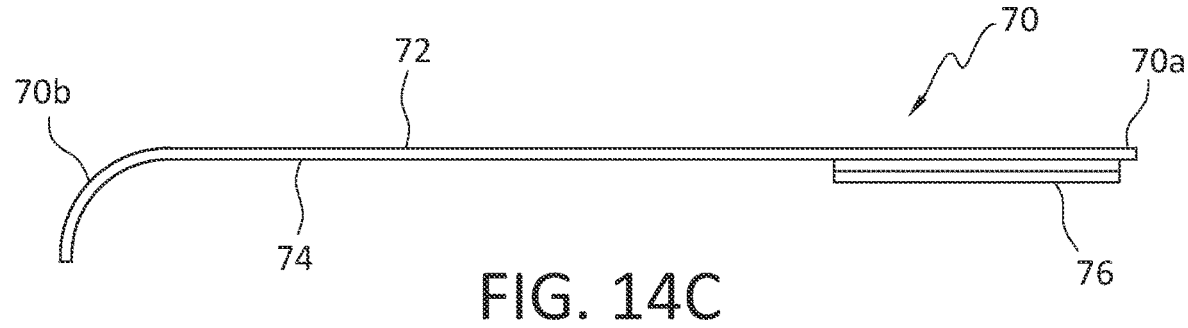
Figure 15A:
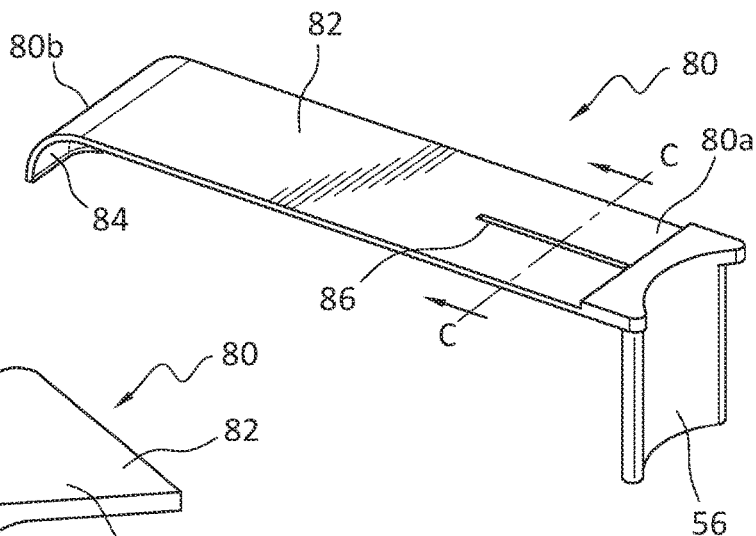
Figure 15B:
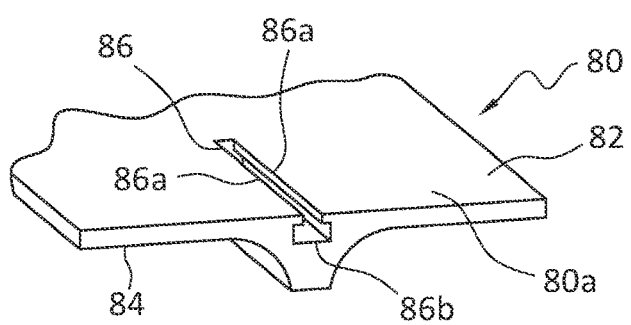
Figure 15C:
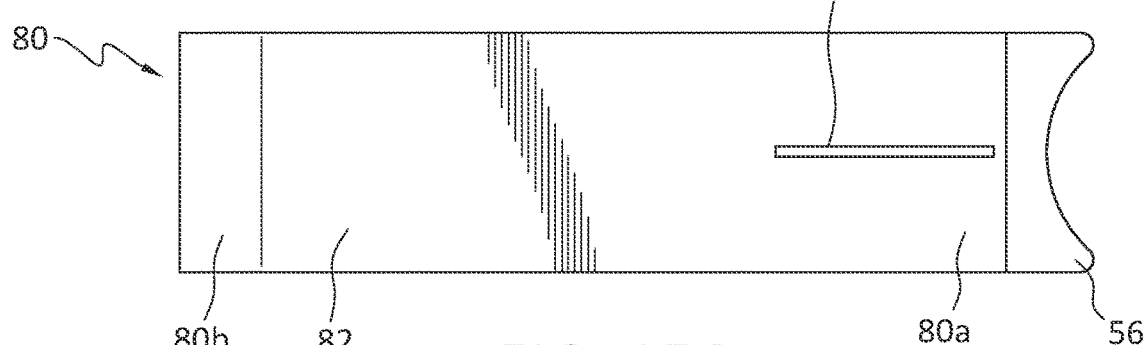
Figure 15D:
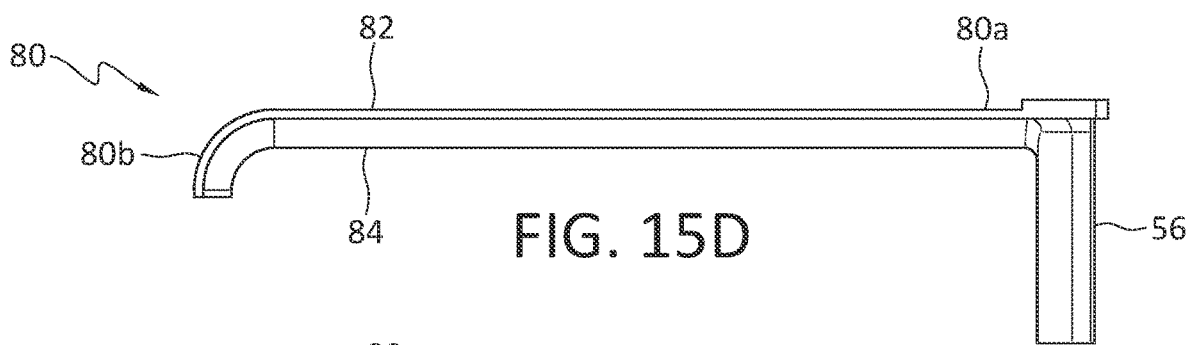
Figure 15E:
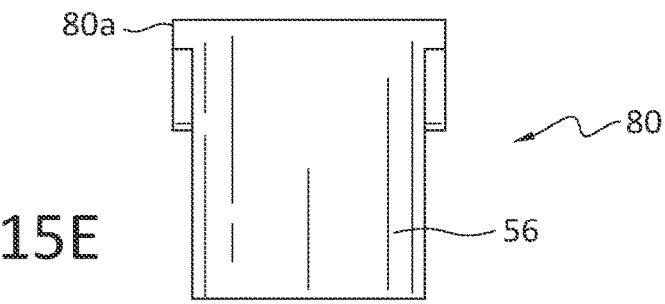
Figure 17:
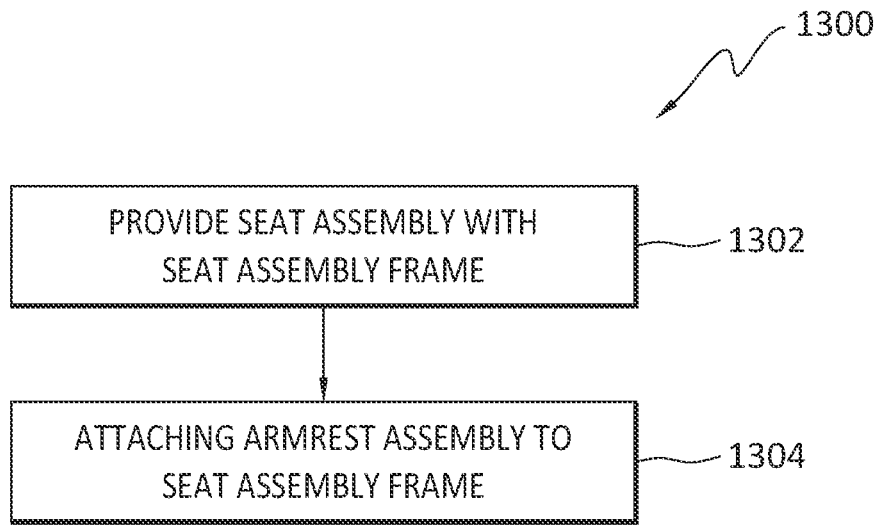
Figure 18:
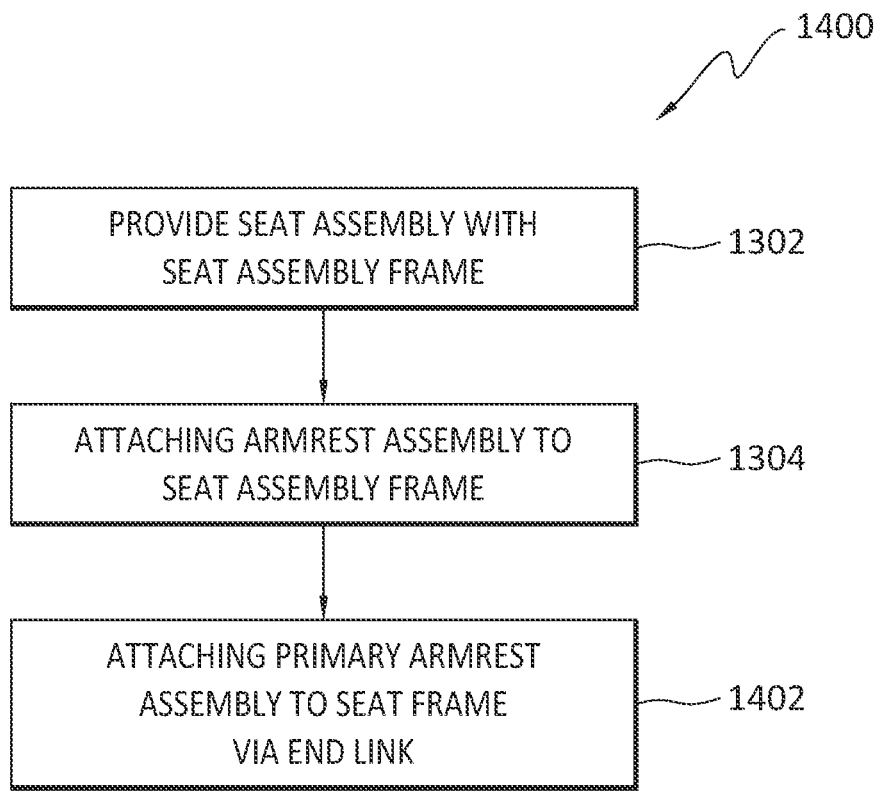
Figure 19:
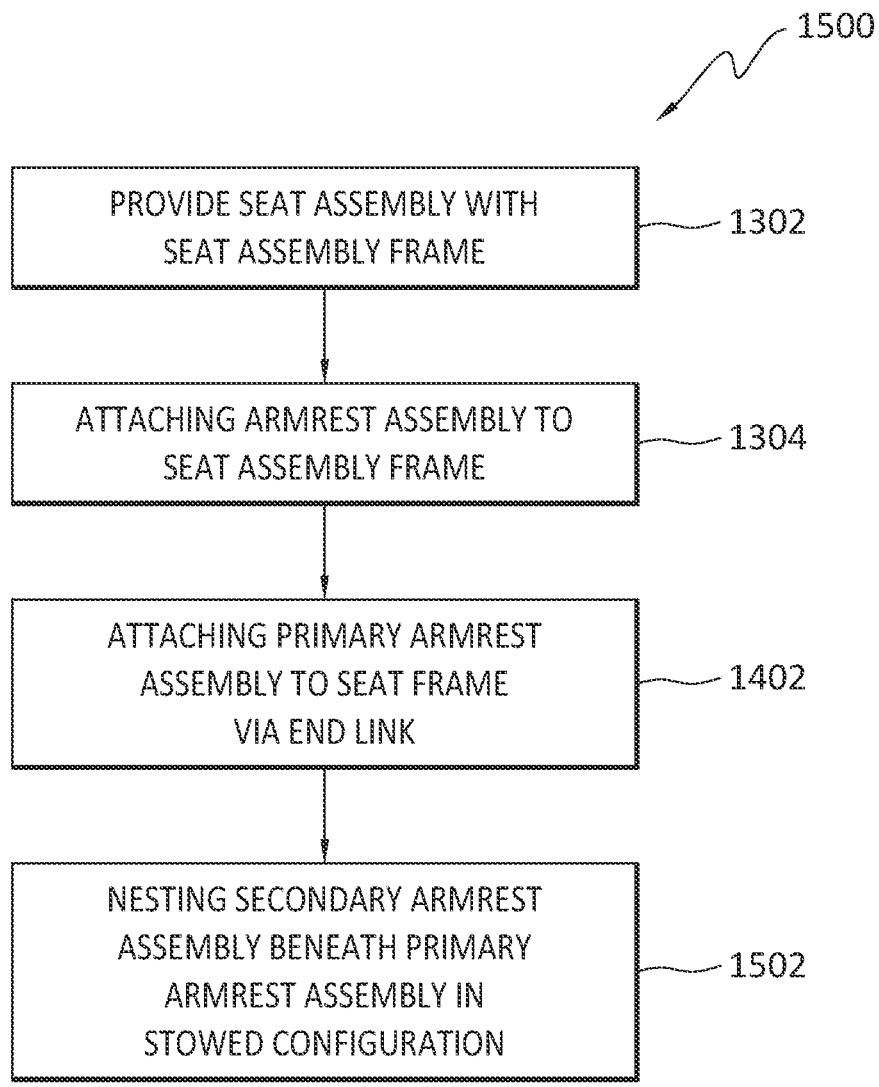

Having thus described variations of the disclosure in general terms, reference will now be made to the accompanying drawings, which are not necessarily drawn to scale, and wherein:

FIG. 1 is an illustration of a vehicle in the form of an aircraft, according to present aspects;

FIG. 2 is a cross-sectional view of a vehicle in the form of an aircraft, as shown in FIG. 1, and according to present aspects;

FIG. 3 is a representative view of a seat assembly comprising a plurality of armrest assemblies, according to present aspects;

FIG. 4 is a representative view of a seat assembly comprising a plurality of armrest assemblies, according to present aspects;

FIG. 5 is a side view of an armrest assembly, according to present aspects;

FIG. 6 is an overhead plan view of an armrest assembly, according to present aspects, FIG. 7 is a perspective view of a secondary armrest assembly in a disassembled state, according to present aspects;

FIG. 8 is a perspective side view of a front link component of a secondary armrest assembly, according to present aspects;

FIG. 9 is a perspective side view of an intermediate link component of a secondary armrest assembly, according to present aspects;

FIG. 10 is a perspective side view of an end link component of a secondary armrest assembly, according to present aspects;

FIG. 11A is a perspective view of an armrest assembly with a secondary armrest in position in a deployed state, according to present aspects;

FIG. 11B is a perspective view of an armrest assembly with a secondary armrest in position in a deployed state, according to present aspects FIG. 12A is a perspective view of an armrest assembly with a secondary armrest in position in a deployed state, according to present aspects;

FIG. 12B is a perspective view of an armrest assembly with a secondary armrest in position in a deployed state, according to present aspects;

FIG. 13A is an enlarged view of an armrest assembly with a secondary armrest in position in a deployed state, according to present aspects;

FIG. 13B is an enlarged view of the proximal end of the secondary armrest intermediate link, according to present aspects;

FIG. 13C is a cross-sectional view of the secondary armrest intermediate link distal end, according to present aspects;

FIG. 14A is a perspective view of the secondary armrest front link length extender, according to present aspects;

FIG. 14B is an overhead plan view of the secondary armrest front link length extender, according to present aspects;

FIG. 14C is a side view of the secondary armrest front link length extender, according to present aspects;

FIG. 15A is an exploded perspective view of the secondary armrest front link assembly, according to present aspects;

FIG. 15B is a perspective cutaway view of the secondary armrest front link assembly shown in FIG. 15A, according to present aspects;

FIG. 15C is an overhead plan view of the secondary armrest front link assembly, according to present aspects;

FIG. 15D is a side view of the secondary armrest front link assembly shown in FIG. 15C, according to present aspects FIG. 15E is a proximal end view of the secondary armrest front link assembly proximal end, according to present aspects;

FIG. 16A is an exploded view of segments of the secondary armrest front link assembly, according to present aspects;

FIG. 16B is a perspective view of the segments (as shown in FIG. 16A) together arranged to form a secondary armrest front link assembly, according to present aspects;

FIG. 16C is a sectional view of the secondary armrest front link assembly as shown in FIG. 16B taken across line D-D, and according to present aspects;

FIG. 17 is a flowchart illustrating a method, according to present aspects;

FIG. 18 is a flowchart illustrating a method, according to present aspects;

FIG. 19 is a flowchart illustrating a method, according to present aspects; and

Figure 20:
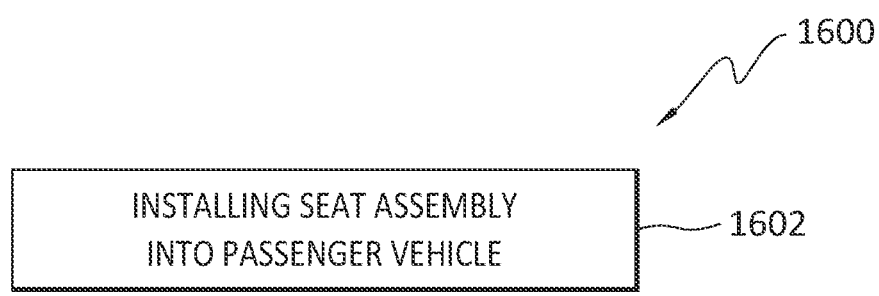

FIG. 20 is a flowchart illustrating a method, according to present aspects.

DETAILED DESCRIPTION

According to present aspects, an armrest assembly is disclosed having a primary armrest and a secondary armrest assembly that can be stowed beneath the primary armrest in a nested configuration beneath the primary armrest. The secondary armrest can be manipulated from a stowed configuration beneath the primary armrest to a deployed configuration that exposes the secondary armrest and positions the secondary armrest to a deployed position that is laterally adjacent to the primary armrest. The height of the secondary armrest, when deployed, can be adjusted by vertically raising the secondary armrest to a height that is lower than, equivalent to, or higher than the height of the primary armrest that may be a fixed primary armrest height.

As shown in the accompanying FIGS., the secondary armrest comprises a secondary armrest assembly that comprises a plurality of moving parts that together facilitated a manipulated and articulated movement of the secondary armrest from a secondary armrest stowed position beneath a primary armrest to a secondary armrest deployed position where the secondary armrest assembly is positioned adjacent to the primary armrest.

The presently disclosed armrest assemblies can be installed into seat assemblies within a seat assembly frame that can support a plurality of adjacently positioned seats within the seat assembly frame. The seating assemblies disclosed herein can stand alone and be positioned in areas designed to seat occupants including, for example, waiting areas, theaters, lecture halls, etc. The seating assemblies disclosed herein can also be incorporated into larger structures including vehicles that can further include, for example, passenger vehicles such as, for example, cars, busses, trains, boats, aircraft, etc. Accordingly, the presently disclosed seating assemblies comprising the presently disclosed armrest assemblies can find utility installed into vehicles including passenger vehicles such as, for example, a crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle; a crewed surface water borne vehicle, an uncrewed waterborne vehicle, a crewed sub-surface water borne vehicle, an uncrewed sub-surface water borne vehicle, and combinations thereof.

FIG. 1 is an illustration of a vehicle in the form of an aircraft, according to present aspects. As shown in FIG. 1, aircraft 10 includes fuselage 12. FIG. 2 is a cross-sectional view of aircraft 10 shown in FIG. 1 and taken across line "A-A", as also shown in FIG. 1. FIG. 2 shows a view into an aircraft cabin 14 of aircraft 10, with the aircraft bounded by the interior of fuselage 12 and assemblies that may be attached to the interior of fuselage 12. FIG. 2 further illustrates seat assemblies 16 positioned throughout the cabin in a selected seating orientation, with the seating assemblies 16 comprising seat assembly frames 17 (seat assembly frames 17 also shown in FIGS. 3 and 4) configured to secure the seating assembly to one or more fixtures located within the aircraft cabin 14 such as, for example, an aircraft cabin floor, structural assemblies in communication with an aircraft cabin floor, aircraft cabin monuments, etc. Seat assemblies 16 are further shown comprising individual seats 16a, 16b, 16c that are positioned in an adjoining configuration within the seat assembly 16. When seats 16a, 16b, 16c are occupied by, for example, a passenger, a passenger seated in one of seats 16a, 16b, 16c would have at least theoretical access to two armrests, with one of the armrests being an armrest assembly 18 positioned between adjoining seats (e.g., positioned between seats 16a and 16b; positioned between 16b and 16c).

FIGS. 3 and 4 are slightly elevated and enlarged front views of a seat assembly 16 comprising adjoined seats 16a, 16b, and 16c, with seat assembly 16 further comprising seat assembly frame 17 that is configured to fixedly attach seat assembly 16 in a fixed position (within, for example, an aircraft cabin) to a structural component or structural assembly (not shown in FIG. 3 or 4).

FIG. 3 shows a passenger 15 (drawn as an outline) representing a passenger seated in seat 16b. As shown in FIG. 3, passenger 15 seated in seat 16b has an arm placed on an armrest assembly 18. FIG. 4 shows passengers 15a and 15b (drawn as an outline) representing a passenger seated in seats 16a and 16c, respectively. As shown in FIG. 4, passengers 15a and 15b each have arms placed upon armrest assemblies 18 seated in seat 16b has an arm placed on a primary armrest 20 of armrest assembly 18.

FIG. 4 is a slightly elevated and enlarged front view of a seat assembly 16 comprising adjoined seats 16a, 16b, and 16c, with seat assembly 16 further comprising seat assembly frame 17 that is configured to fixedly attach seat assembly 16 in a fixed position (within, for example, an aircraft cabin) to a structural component or structural assembly (not shown in FIG. 3 or 4). FIG. 3 further shows a passenger 15 (drawn as an outline) representing a passenger seated in seat 16b. As shown in FIG. 3, passenger 15 seated in seat 16b has an arm placed on a primary armrest 20 of an armrest assembly 18.

Although not explicitly shown or easily viewed in FIG. 3 or 4, armrest assemblies 18 that are positioned between adjacent and/or adjoining seats can be movably and pivotably attached (e.g., configured to facilitate a vertically pivoting motion about a fixed point that can be, for example, a pin), or are otherwise in movable and pivotable communication with seat assembly 16 and/or seat assembly frame 17, or another seat assembly component, etc., with armrest assemblies 18 configured to move and pivot from a deployed substantially horizontal position ready for use (e.g., by a seated passenger), to a retracted and stowed position that can be a substantially vertical stowed position between adjacent seats, and that can be coincident with a positioning of the armrest assembly between adjacent/adjoining seat backs of seats in a seat assembly of the type shown and described herein. As shown in FIG. 4, passengers 15a and 15b are not sitting in adjoining seats. Accordingly, passengers 15a and 15b would not be sharing an adjoining armrest between them as they otherwise might be forced to do if they were seated immediately adjacent to one another (e.g., in adjoining seats, etc.).

Returning to FIG. 3, armrest assembly 18 is shown in further detail with passenger 15 having arms on a primary armrest 20 of armrest assembly 18. FIG. 3 further shows secondary armrest assembly 23 deployed into a deployed position from a stowed position (e.g., a "nested" position) beneath primary armrest 20 of armrest assembly 18. In the stowed or "nested" configuration, the secondary armrest assembly 23 is in significant alignment with, and beneath, the primary armrest 20 of armrest assembly 18. That is, whatever dimensional surface footprint the upper surface (e.g., the surface area, etc.) of the secondary armrest assembly has (particularly the secondary armrest front link discussed in more detail herein), according to present aspects, such dimensional footprint of the secondary armrest assembly (and particularly the secondary armrest front link) is configured to nest beneath and be completely covered by dimensional footprint (e.g., the surface area, etc.) of the primary armrest 20 when the secondary armrest assembly 23 is in the stowed configuration, and stowed beneath the primary armrest 20.

In a hypothetical setting, if a second passenger were seated next to passenger 15, armrest assembly 18 can be configured to deploy the secondary armrest assembly 23 from beneath primary armrest 20 such that a passenger adjoining passenger 15 would have access to an armrest (the secondary armrest assembly 23) dedicated to that adjoining passenger, without interfering with the ability of the adjoining passenger 15 to support the arms of adjoining passenger 15. That is, whatever dimensional surface footprint the upper surface (e.g. surface area, etc.) of the secondary armrest assembly 23 has (particularly the secondary armrest front link discussed in more detail herein), according to present aspects, such dimensional footprint of the secondary armrest assembly (and particularly the secondary armrest front link) is configured to be deployed from the nested stowed configuration, exposing the secondary armrest assembly 23, and at least exposing the secondary armrest front link from beneath the primary armrest 20, such that the secondary armrest assembly 23 in the deployed configuration is not in alignment with the primary armrest 20 and, instead, is accessible as a dedicated armrest for use by an adjacently seated passenger.

FIG. 5 is an enlarged and partially exposed overhead plan view of an armrest assembly 18 according to present aspects, and with armrest assembly 18 comprising an exposed view of a primary armrest 20 and a secondary armrest assembly 23 (in a deployed configuration) that comprises a secondary armrest front link 50 that is in articulable and pivotably movable communication with a secondary armrest intermediate link 40 about, for example, a secondary armrest intermediate distal end pin 44c, according to present aspects. The secondary armrest intermediate link 40 is, in turn, in articulable and pivotably movable communication with armrest assembly end link 24 about armrest assembly end link distal end pin 28c (also referred to equivalently herein as "armrest assembly end link distal end flange pin 28c").

According to present aspects, the secondary armrest front link 50 in combination with the secondary armrest intermediate link 40 and the armrest assembly end link 24 can together comprise, in a three-component assembly, the secondary armrest assembly 23. In use, and as installed into a seat assembly, the armrest assembly end link can comprise a distal end that can be attached to or otherwise in communication with a component of the seat assembly that can be, for example, a section of the seat assembly frame, adjoining/adjacent seat backs, other seat assembly structural components, etc.

According to alternate aspects, a seat assembly, seat assembly component, seat frame, etc., can incorporate a component similar in function to the assembly end link 24. According to this alternate embodiment, the secondary armrest front link 50 in combination with the secondary armrest intermediate link 40 can together comprise, in a two-component assembly, the secondary armrest assembly 23 that will movably and pivotably engage with the integral feature of the seat assembly, seat assembly component, seat frame, etc., that performs the function of the armrest assembly end link 24 shown in the presently disclosed three-component armrest assemblies.

FIG. 5 further shows comparative dimensions (e.g., "length (L1, L2) and "width" (W1, W2)) of the primary armrest 20 in comparison with the secondary armrest assembly 23 comprising the secondary armrest front link 50. As shown at least in FIG. 5, the primary armrest 20 comprises a length, "L1" that extends from the primary armrest proximal end 20c to the primary armrest distal end 20d. The portion of the secondary armrest assembly 23 that can movably pivot about armrest assembly end link 23 and movably pivot out from a stowed position beneath primary armrest 20 to a secondary armrest deployed position (exposing secondary armrest front link 50 and secondary armrest intermediate link 40) comprises a length L2 extending from the secondary armrest front link proximal end 52c to the secondary armrest front link distal end 52d. As shown at least in FIG. 5, length L2 can be less that length L1. In addition, as shown at least in FIG. 5, primary armrest 20 comprises an average width W1 and secondary armrest front link comprises an average width W2, wherein average width W2 can be less than or equal to W1.

As mentioned herein, in alternate aspects, the armrest assembly end link 24 can be integral with a seat assembly or a seat assembly frame, adjoining/adjacent seat backs, or other seat assembly structural component such that, in the alternate aspects, the secondary armrest assembly 23 comprises only the secondary armrest front link 50 and the secondary armrest intermediate link 40.

The terms "proximal;" and "distal" are terms of relative orientation with respect to another structure including the point of attachment to another structure. According to present aspects, and as used herein, the term "proximal" or "proximal end" is the end of a component that is nearer to a point of attachment of another structure that is closest to a seat assembly or seat assembly frame. According to present aspects, and as used herein, the term "distal" or "distal end" is the end of a component that is furthest away from a point of attachment of another structure that is further away from a seat assembly or seat assembly frame. The present disclosure means to convey no special or alternate meaning to the terms "proximal" and "distal" beyond that, which one in the field of mechanical design would readily appreciate and understand.

FIGS. 6, 7, and 8 show component parts of the armrest assembly 18 that, when connected in articulated and movable (including pivotably movable) communication, and in combination, can comprise the secondary armrest assembly 23, according to present aspects. FIG. 6 shows an enlarged perspective side view of the armrest assembly end link 24 that, at the armrest assembly end link proximal end 25a, can attach to (or that, in an alternate aspect can be integral with) a seat assembly component (e.g., a seat assembly frame, seat assembly structural component, seat support, etc.). Armrest assembly end link 24 comprises armrest assembly end link proximal end 25a and armrest assembly end link distal end 25b.

Armrest assembly end link proximal end 25a comprises at least one armrest assembly proximal end flange 26a and, as shown in FIG. 6, armrest assembly end link 24 shows two armrest assembly end link proximal end flanges 26a that are spaced a selected distance from one another. At least one of the armrest assembly end link proximal end flanges 26a comprises an armrest assembly end link proximal end flange through opening 26b having a diameter configured to accept and allow to pass therethrough an armrest assembly end link proximal end flange pin 26c.

Armrest assembly end link distal end 25b comprises at least one armrest assembly distal end flange 28a, and as shown in FIG. 6, armrest assembly end link 24 shows two armrest assembly end link distal end flanges 28a that are spaced a selected distance from one another. At least one of the armrest assembly end link distal end flanges 28a comprises an armrest assembly end link distal end flange through opening 28b having a diameter configured to accept and allow to pass therethrough an armrest assembly end link distal end flange pin 28c.

As shown in FIG. 6, alignment projections 34 are located at (and can be located within) the armrest assembly end link proximal flanges, with the alignment projections 34 dimensioned to mate with associated recesses within, for example, a support structure (e.g., a seat assembly frame) to which the armrest assembly end link proximal end is attached (not shown in FIG. 6). Although not shown, in alternate aspects, instead of the alignment projections being integrated into the armrest assembly end link proximal end, the end link proximal end can comprise at least one alignment recess or alignment through opening into which or through which an associated alignment feature on a structural component can, for example, mate.

According to present aspects, FIG. 7 shows an enlarged perspective view of a secondary armrest assembly intermediate link 40 that can be configured to attach to the armrest assembly end link 24 shown at least in FIG. 6 and described herein. As shown in FIG. 7, secondary armrest intermediate link 40 comprises a secondary armrest intermediate link proximal end 42 that further comprises a secondary armrest intermediate link proximal end flange 42a that comprises a secondary armrest intermediate link proximal end flange through opening 42b. Secondary armrest intermediate link 40 further comprises a secondary armrest intermediate link distal end 44 that comprises, as further shown in FIG. 7, two secondary armrest intermediate link distal end flanges 44a spaced a selected distance from one another, and that each further comprise a secondary armrest intermediate link distal end flange through opening 44b configured and otherwise dimensioned to receive and secure a secondary armrest intermediate link distal end pin 44c. FIG. 7 further shows the secondary armrest intermediate link 40 comprising a secondary armrest intermediate link cushion second section 48.

In alternate present aspects, not shown in FIGS. 6 and 7, the number of flanges and orientation of the flanges at proximal and distal ends of the armrest assembly end link 24 and the secondary armrest intermediate link 40 can vary, so long as the two link types are configured to movably and pivotably interconnect with one another in an articulating and cooperative relationship such that the secondary armrest intermediate link 40 can achieve and retains a range of pivoting and articulating motion about a pin or other retainer connecting the armrest assembly end link 24 and the secondary armrest intermediate link 40 (e.g., to enable and allow the secondary armrest intermediate link 40 to movably swivel, rotate, pivot, etc. horizontally or laterally with respect to the armrest assembly end link 24, etc.).

FIG. 8 shows an enlarged perspective view of a secondary armrest front link 50 that can be configured to attach to the secondary armrest intermediate link 40 shown at least in FIG. 7 and described herein, according to present aspects. As shown in FIG. 8, secondary armrest front link 50 comprises a secondary armrest front link first surface (oriented in FIG. 8 as an "upper" surface") 52a and a secondary armrest front link second surface (oriented in FIG. 8 as an "lower" surface") 52b. Secondary armrest front link 50 further comprises a secondary armrest front link proximal end 52c that further comprises a secondary armrest intermediate link proximal end flange 54a that comprises a secondary armrest intermediate link proximal end flange through opening 54b. Secondary armrest intermediate front link 50 further comprises a secondary armrest front link distal end 52d. As further shown in FIG. 8, and according to present aspects, secondary armrest front link 50 further comprises a secondary armrest front link cushion first section 58 positioned adjacent to, and otherwise attached to the secondary armrest front link first surface 52a. The secondary armrest front link proximal end flange 54a has a selected width (e.g., a selected flange thickness, etc.) and is otherwise dimensioned to be accepted between the secondary armrest intermediate link distal end flanges 44a. That is, according to present aspects, the secondary armrest intermediate link distal end flanges 44a are spaced apart to receive therebetween the secondary armrest front link proximal end flange 54a.

In alternate present aspects, not shown in FIGS. 7 and 8, the number of flanges and orientation of the flanges at the secondary armrest intermediate link distal end 44 and the secondary armrest front link proximal end 52c can vary, so long as the two link types are configured to movably and pivotably interconnect and articulate with one another such that the secondary armrest front link 50 achieves and retains a range of pivoting and articulating motion about a pin or other retainer interconnecting the secondary armrest front link 50 and the secondary armrest intermediate link 40 (e.g., the secondary armrest intermediate link distal end pin 44c, as shown in FIG. 7) to enable and allow the secondary armrest front link 50 to movably swivel, rotate, pivot, articulate, etc. horizontally or laterally with respect to the secondary armrest intermediate link 40.

As shown at least in FIGS. 8 and 9, secondary armrest assembly 23 comprises a usable length L2 extending at least from the secondary armrest front link proximal end 52c to the secondary armrest front link distal end 52d. In addition, as shown at least in FIGS. 8 and 9, secondary armrest front link 50 comprises an average width W2, with the average width W2 that can be less than or equal to W1 of the primary armrest 20 (not shown in FIG. 8 or 9).

As shown in FIG. 9, according to present aspects, when movably joined and in an interconnected and articulable combination, the secondary armrest front link 50, and the secondary armrest intermediate link 40 together and in movably pivotably joined combination can together form the secondary armrest assembly 23. The armrest assembly can be integrated into a structural component of a seat assembly, and the secondary armrest assembly 23 can movably and pivotably attach to the armrest assembly end link 24.

According to further aspects, if desired, the secondary armrest assembly can itself further comprise the armrest assembly end link 24, such that the armrest assembly 18 can be a three main component structure; e.g., the secondary armrest front link 50 movably and pivotably joined at the secondary armrest front link proximal end flange 54a to the secondary intermediate link distal end flange(s) 44a of the secondary armrest intermediate link 40 that is also movably and pivotably joined by the secondary armrest intermediate link proximal end flange 42a to the armrest assembly end link distal end flanges 28a of the armrest assembly end link 24, with the end link 24 then connected to a structural seat component (e.g., a seat assembly frame, etc.). As further shown in FIG. 9, the secondary armrest intermediate link 40 is shown movably and pivotably engaged with the secondary armrest front link 50, and with the upper secondary armrest intermediate link distal flange 44a covered by, and otherwise in contact with and supporting a fixedly attached secondary armrest intermediate link cushion second section 48.

As stated herein, the secondary armrest assembly 23 is configured dimensionally to "nest" beneath a primary armrest when the secondary armrest assembly is in a stowed configuration (where, e.g., the secondary armrest assembly is substantially longitudinally aligned with the primary armrest and nests beneath the primary armrest, etc.). FIG. 10 is an enlarged perspective side, and slightly, elevated view of the armrest assembly 18 comprising the primary armrest 20 with the secondary armrest assembly 23 nested beneath the primary armrest 20. More specifically, as shown in FIG. 10, the primary armrest 20 comprises a primary armrest first surface (e.g., an "upper" or "top" surface) 20a and a primary armrest second surface (e.g., a "lower" or "bottom" surface) 20b. Primary armrest 20 further comprises a primary armrest proximal end 20c and a primary armrest distal end 20d, with the primary armrest distal end 20d shown extending beyond and otherwise "covering" the distal end of the secondary armrest assembly 23.

According to a present aspect, FIG. 10 shows the armrest assembly 18 showing the secondary armrest intermediate link distal end pin 44c disposed through the two secondary armrest intermediate link distal end flanges 44a and the secondary armrest front link proximal end flange 54a. As shown in FIG. 10, the secondary armrest intermediate link distal end pin 44c can be, for example, a threaded pin, or a bolt that can be retained in position by mating with a threaded fastener 44d, etc. FIG. 10 further shows the armrest assembly end link 24 movably and pivotably engaged with the secondary armrest intermediate link 40, with the armrest assembly end link distal end pin 28c disposed through the two armrest assembly end link distal end flanges 28a and the secondary armrest intermediate link proximal end flange 42a. As shown in FIG. 10, the armrest assembly end link distal end pin 28c can be, for example, a threaded pin, or a bolt that can be retained in position by mating with a threaded fastener 28d, etc. FIG. 10 further shows the armrest assembly end link proximal end flanges 26a comprising an armrest assembly end link proximal end flange through opening 26b with an armrest assembly end link proximal end flange pin 26c in position.

According to present aspects, and as described herein, the width of the secondary armrest assembly can be selected and dimensioned to be less than or equivalent to the width of the primary armrest, such that the secondary armrest assembly can fully nest beneath and adjacent to the primary armrest when the secondary armrest assembly is in the stowed configuration. In this way, in the stowed configuration, the secondary armrest is essentially "hidden" from view, when the overall armrest assembly is viewed from above. When deployment of the secondary armrest assembly is desired, a force can be applied to the secondary armrest assembly (e.g., a manually applied force or an automated force, with an automated force that can be generated by, force example, a mechanical or electrical drive assembly, a hydraulic drive assembly, a pneumatic drive assembly, etc.) to move the secondary armrest assembly from a stowed configuration to an outwardly deployed configuration that is outward, away from, and out from under, etc., the primary armrest (e.g., the dimensional footprint of the primary armrest, at least in terms of the width of the primary armrest).

FIG. 11A is an enlarged perspective view, according to present aspects, of the armrest assembly installed in position within a seat assembly that can be, for example, a passenger seat assembly, and that can be of the type shown at least in FIGS. 2, 3, 4, and 10, with a modification. As shown in FIG. 11A, armrest assembly 18 comprises the primary armrest 20 having a primary armrest first surface 20a, primary armrest second surface 20b, primary armrest proximal end 20c and primary armrest distal end 20d. As shown in FIG. 11A, a primary armrest cushion layer 22 is positioned adjacent to and otherwise is configured to cover the primary armrest first surface 20a. Secondary armrest assembly 23 is shown in a deployed configuration with the secondary armrest assembly 23 movably and pivotably articulated from the stowed position (e.g., the stowed position being the position where the secondary armrest assembly is nested and otherwise rests in a stowed position immediately beneath the primary armrest second surface 20b) and moved into the deployed position that is laterally adjacent to, and out from under, the footprint of the primary armrest 20.

As shown in FIG. 11A, secondary armrest front link 50 comprises a secondary armrest front link proximal end 52c and a secondary armrest front link distal end 52d, with the secondary armrest front link 50 as shown in FIG. 11A covered by a secondary armrest front link cushion first section 58. The secondary armrest intermediate link 40 is shown movably and pivotably engaged with the secondary armrest front link 50, with the secondary armrest intermediate link 40 covered by and otherwise supporting an attached secondary armrest intermediate link cushion second section 48. An armrest assembly end link 24 is partially visible in FIG. 11A and is shown movably and pivotally engaged with secondary armrest intermediate link 40.

FIG. 11A further shows comparative dimensions (e.g., "length" (L1) and "width" (W1)) of the primary armrest 20 in comparison with the width (W2) and length (L2) of the secondary armrest assembly 23 comprising the secondary armrest front link 50. As shown at least in FIG. 11A, the primary armrest 20 comprises a length, L1 that extends from the primary armrest proximal end 20c to the primary armrest distal end 20d. Secondary armrest assembly 23 comprises a length L2 extending from the secondary armrest front link proximal end 52c (or also from the secondary armrest assembly intermediate link 40) to the secondary armrest front link distal end 52d. As shown at least in FIG. 11A, length L2 can be less that length L1. In addition, as shown at least in FIG. 11A, primary armrest 20 comprises an average width W1 and secondary armrest front link comprises an average width W2, wherein average width W2 can be less than or equal to W1.

As shown in FIG. 11A, since the secondary armrest assembly 23 is pivoted laterally and away from, and out from beneath the primary armrest 20 to deploy the secondary armrest assembly, the height of the secondary armrest assembly in an initial deployed configuration approximates the height of the secondary armrest assembly in the stowed configuration, with the height of the secondary armrest assembly 23, as shown in FIG. 11A being less than (being lower than) the height of the primary armrest 20. In addition, since the secondary armrest assembly is nested beneath and within the longitudinal footprint of the primary armrest (at least when viewed from above), the length of the secondary armrest assembly in the stowed and deployed configuration, as shown in FIG. 11A is less than the length of the primary armrest.

According to alternate present aspects, the overall length of the secondary armrest assembly 23 can be altered, tailored, or otherwise adjusted from an initial length in the initial deployed configuration (with the initial length of the secondary armrest assembly in the deployed configuration approximating the length of the secondary armrest assembly in the stowed and substantially fully retracted configuration) to an increased second length or lengths in a fully deployed configuration. FIG. 11B shows the armrest assembly 18 similar to that shown in FIG. 11A, with the exception that the secondary armrest assembly 23 is shown in an extended (e.g., an extended deployed) configuration such that the secondary armrest front link 50a can be extended, providing the secondary armrest assembly 23 with a significantly enhanced flexibility to convert the overall length of the secondary armrest assembly 23 to a plurality of adjustable and selected secondary armrest assembly lengths; with such plurality of selected secondary armrest assembly lengths configured to be equivalent to or greater than the length of the primary armrest 20.

As shown in FIG. 11B, secondary armrest assembly 23 has a longer length (L3) that that length L2 shown in FIG. 11A. FIG. 11B shows the secondary front link 50a comprising a secondary armrest front link proximal end 52c and a secondary armrest front link distal end 52d. As shown in FIG. 11B, the secondary armrest front link distal end 52d can be extended longitudinally such that the secondary armrest front link 50a is configured to form a secondary armrest assembly 23 that is now longer (having a new secondary armrest length, L3) than the primary armrest 20 (e.g., the secondary armrest assembly now is configured to have a length L3 that is greater than the length L1 of the primary armrest 20). According to present aspects, the length L3 of the secondary armrest assembly can be attained by adjustably increasing the length of the secondary armrest front link 50a from an initial stowed length L2 by withdrawing or extracting or extending a secondary armrest front link length extender 52e (e.g. a front link extender that is contained within the secondary armrest front link 50a as a movable and extending part of the secondary armrest front link 50a). The secondary armrest front link length extender 52e can be an extendable member that extends along the longitudinal axis of the secondary armrest assembly 23.

In one alternate aspect, it is contemplated that secondary armrest front link 50a can be configured to comprise a front link internal sleeve (not shown) comprising a front link recess bounded by the walls of the recess, with the recess dimensioned to accommodate the retracted storage of the secondary armrest front link length extender 52e in a stowed configuration, and otherwise facilitate the release of the extendable front link extender from a retracted configuration within a longitudinal front link recess, for example. In another aspect, the secondary armrest front link 50a can be configured to comprise a front link component that separates longitudinally for the purpose of extending the overall length of the secondary armrest front link 50a, and as shown in the FIGS. herein to both accommodate the retracted storage of the secondary armrest front link length extender 52e in a stowed configuration, and otherwise facilitate the release and extension of the extendable front link extender from a retracted configuration.

According to further present aspects, although not shown in FIGS. 11A and/or 11B, the secondary armrest front link can further comprise a positional locking mechanism that can be in communication with actuators and otherwise be configured to communicate with the secondary armrest front link extender to effect an increase in the effective secondary armrest front link length representing a series of a fixed number of extending length "stops", or than can effect an increase in the effective secondary armrest front link length representing a theoretically infinite number of extending lengths through, for example, a tightening and loosening mechanism configured to allow the extender to achieve a multitude of varied extender lengths. The extender can be in communication with manually controlled and actuated as well as automated mechanical mechanisms that can, in turn be in communication with a controller that is further in communication with hardware and software responsible for sending signals to actuators and/or motors to electrically, hydraulically, pneumatically, etc. direct a force to the extender to both extend and retract and otherwise adjust the length of the extender that, in turn regulates the overall length of the secondary armrest front link length, further regulating the overall length of the secondary armrest assembly, at least distally, and in relation to the primary armrest of the armrest assembly. Greater non-limiting detail of the secondary armrest front link extender along with a non-limiting example of "locking mechanisms" is shown herein in FIGS. 14A, 14B, 14C, 14D, 15A, 15B, 16A, 16B, and 16C, and further described herein.

FIG. 11B further shows comparative dimensions (e.g., "length (L1) and "width" (W1) of the primary armrest 20 in comparison with the width (W2) of the secondary armrest assembly 23 comprising the secondary armrest front link 50a, and the lengths of the secondary armrest front link both in retracted lengthwise, or stowed, configuration (L2) and the extended lengthwise, or deployed, configuration (L3). In addition to adjusting the length of the secondary armrest assembly as discussed herein and shown in at least FIGS. 11B, further present aspects contemplate the secondary armrest assembly being configured to movably adjust the height of the secondary armrest assembly from an initial "height" relative to the primary armrest in the secondary armrest stowed configuration to a second "height" or "heights" in a secondary armrest assembly deployed state, such that the secondary armrest assembly can be movably adjusted vertically to a selected and adjustable height that is less than, equivalent to, or greater than the height of the primary armrest, and to a height that is different than the height of the secondary armrest assembly in the stowed state (e.g., beneath the primary armrest).

As shown in FIGS. 12A and 12B, and according to alternate present aspects, the secondary armrest front link proximal flange can be modified to comprise a secondary armrest front link proximal end flange recess 54c that can be in form of a vertical recess bounded by vertical recess walls in the secondary armrest front link proximal end flange 54a. Such secondary armrest front link proximal end flange recess 54c in the secondary armrest front link proximal end flange 54a can be machined (e.g., drilling, etc., or can be molded, etc.) into a secondary armrest front link proximal end flange 54a. The secondary armrest front link proximal end flange recess 54c can be configured and otherwise dimensioned to receive a secondary armrest front link vertical extender 56.

FIG. 12A is an enlarged perspective view of armrest assembly 18 in position in a seat assembly and positioned between adjoining seats in a seat assembly that can be, for example, a passenger seat assembly (that can be, for example, a passenger seat assembly in, for example, a passenger vehicle such as, for example, a passenger aircraft), and that can be of the type shown at least in FIGS. 2, 3, 4, 10, 11A, and 11B. The armrest assembly shown in FIG. 12A is similar in many respects to the armrest assembly 18 shown in FIG. 11A, and similarly numbered features exist in FIGS. 12A and 11A. In addition, in the armrest assembly 18 shown in FIG. 12A, and according to alternate present aspects, the secondary armrest assembly 23, once moved from the stowed configuration beneath the primary armrest 20 to the deployed configuration, can be variably adjusted vertically and otherwise configured to adjust to varying heights relative to the primary armrest (e.g., to extend/raise from, and retract/lower back into, etc.) the secondary armrest front link proximal end flange recess 54c of the secondary armrest front link 50b such that the secondary armrest front link 50b can be configured to adjust vertically to a selected vertical position having a selected height relative to the primary armrest.

More specifically, as shown in FIG. 12A, secondary armrest assembly 23 comprises a secondary armrest front link 50b that is dimensioned and otherwise configured to be received by a secondary armrest front link proximal end flange recess 54c in the secondary armrest front link proximal end flange 54a, with the secondary armrest front link proximal end flange recess 54c formed and defined by surrounding secondary armrest front link proximal flange recess walls (not visible in FIGS. 12A and 12B) that descend into the secondary armrest front link proximal end flange 54a (e.g., descend into and within the body of the secondary armrest front link proximal end flange 54a). As shown in FIG. 12A, the secondary armrest front link 50b can be raised to height represented by "H2", that can be less than the overall length of the secondary armrest front link vertical extender 56. The distance or "height" that the vertical extender 56 is raised from the secondary armrest front link proximal end flange recess 54c can be a height required to move the front link 50b from an initial or secondary armrest front link "first" height in a stowed configuration that is lower than the height of the primary armrest 20 (e.g., a first "height" that allows the secondary armrest assembly to nest beneath the primary armrest—see, e.g., height "H1" of the secondary armrest shown in FIG. 11A) to a secondary armrest front link "second" height H2 in a deployed configuration. According to present aspects, the secondary armrest front link can be adjusted, in terms of height, to a secondary armrest front link second height H2 (that is a distance value that less than, equal to, or greater than the height of the primary armrest) as selected, for example, by a seated passenger, and with H2 being a distance value, or "height" that is greater than H1.

FIG. 12B is an enlarged perspective view of armrest assembly 18 in position in a seat assembly, and positioned between adjoining seats in a seat assembly that can be, for example, a passenger seat assembly, and that can be of the type shown at least in FIGS. 2, 3, 4, 10, 11A, 11B, and 12A. The armrest assembly shown in FIG. 12B is similar in many respects to the armrest assembly 18 shown in FIG. 12A, and similarly numbered features exist in FIGS. 12A and 12BA. In addition, in the armrest assembly 18 shown in FIG. 12B, and according to alternate present aspects, the secondary armrest assembly 23 in the deployed position can be variably adjusted vertically and otherwise configured to raise from, and retract (e.g., lower, etc.) back into the secondary armrest front link proximal end flange recess 54c such that the secondary armrest front link 50c is configured to be variably positioned to a selected height H2 relative to the height of the primary armrest 20.

More specifically, as shown in FIG. 12B, secondary armrest assembly 23 comprises a secondary armrest front link vertical extender 56 that is dimensioned and otherwise configured to be received by a secondary armrest front link proximal end flange recess 54c in the secondary armrest front link proximal end flange 54a, with the secondary armrest front link proximal end flange recess 54c formed and defined by surrounding secondary armrest front link proximal end flange recess walls 54d (not visible in FIGS. 12A and 12B, but shown, for example in FIG. 13B) that descend into the secondary armrest front link proximal end flange recess 54c (e.g., descend into and within the body of the secondary armrest front link proximal end flange 54a).

In addition, as shown in FIG. 12B and similar to the secondary armrest front link 50a shown in FIG. 11B, the secondary armrest assembly 23 is shown in an extended configuration such that the secondary armrest front link 50c also can be extended longitudinally outward to an extended length in and along the longitudinal axis of the secondary armrest front link 50c, and the secondary armrest assembly can also be extended vertically to variably adjust the secondary armrest front link 50c to a selected height H2 relative to the primary armrest. According to aspects as shown in FIG. 12B the secondary armrest front link 50c possesses attributes resulting in a secondary armrest assembly and an overall armrest assembly positional flexibility with respect to significantly enhanced flexibility to convert the overall length of the secondary armrest assembly to a plurality of selected secondary armrest assembly lengths L3 (with such plurality of selected secondary armrest assembly lengths L3 configured to be equivalent to or greater than the length of the primary armrest L1 and greater than the length of the secondary armrest in the stowed configuration, L2), as well as the aforementioned presently disclosed advantages with respect to the ability to attain variably adjustable secondary armrest front link heights, H2 (e.g., relative to the primary armrest height, etc.).

As shown in FIG. 12B, secondary armrest assembly 23 has a longer length "L3" that that shown in FIG. 12A (e.g., as compared to length, "L2"). FIG. 12B shows the secondary front link 50c comprising a secondary armrest front link proximal end 52c and a secondary armrest front link distal end 52d. As shown in FIG. 12B, the secondary armrest front link distal end 52d can be extended outwardly along the longitudinal axis of the front link such that the secondary armrest front link 50c is configured to form a secondary armrest assembly 23 that is now in an extended configuration, and is now longer (e.g., now having a length, "L3") than the length "L1" of the primary armrest 20 (e.g., the secondary armrest assembly now is configured to have a length "L3" that is greater than both the length "L1" of the primary armrest, and the length "L2" of the secondary armrest front link when such front link is not in a non-extended configuration—e.g., when the secondary armrest is in a retracted or stowed configuration beneath the primary armrest, etc.).

According to present aspects, and as shown in FIG. 12B, the length of the secondary armrest assembly 23 can be adjustably increased from an initial stowed length by withdrawing or extracting or extending a secondary armrest front link length extender 52e from the secondary armrest front link 50c.

In addition to variably adjusting the length of the secondary armrest assembly as discussed herein and shown in at least FIGS. 11B and 12B, further present aspects as shown in FIG. 12B contemplate the secondary armrest assembly 23 being configured to also movably adjust the height of the secondary armrest assembly 23 in the deployed state such that the secondary armrest assembly 23 can be movably and variably adjusted vertically to a height H2 that is less than, equivalent to, or greater than the height of the primary armrest, and to a height that is different (e.g., greater than) than the height H1 secondary armrest assembly in the stowed state beneath the primary armrest.

According to further present aspects, although not shown in FIGS. 12A and/or 12B, the secondary armrest intermediate link can further comprise a positional locking mechanism that can be in communication with actuators and otherwise be configured to communicate with the secondary armrest front link vertical extender to effect an increase in the effective secondary armrest front link height representing a series of a fixed number of extending height "stops", or than can effect an increase in the effective secondary armrest front link height representing a large number of varying extending heights through, for example, a tightening and loosening mechanism configured to allow the extender to achieve a multitude of varied extender lengths.

The vertical extender of the secondary arm rest front link proximal end in combination with mechanisms in the secondary armrest front link proximal flange can be, for example, in communication with manually controlled and actuated mechanisms, as well as in communication with automated mechanical mechanisms that can, in turn, be in communication with a controller that is further in communication with hardware and software responsible for sending signals to actuators and/or motors to electrically, hydraulically, pneumatically, etc. direct a force to the front link vertical extender to both extend and retract and otherwise adjust the height of the front link vertical extender that, in turn, can regulate the overall height of the secondary armrest front link height, further regulating the overall height of the secondary armrest assembly, at least vertically, and in relation to the primary armrest of the armrest assembly.

Non-exclusive examples of locking mechanisms for the vertical extender of the secondary armrest front link are shown in FIGS. 13A, 13B, and 13C. FIG. 13A is an enlarged partial view of the secondary armrest front link 50b as shown, for example, in FIG. 12A, and showing in greater detail the secondary armrest front link proximal end 52c comprising a secondary armrest front link vertical extender 56 engaged within a secondary armrest front link proximal end flange recess 54c as shown located at and within secondary armrest front link proximal end flange 54a.

FIG. 13A further shows the location of indexing depressions 60 located in a vertical orientation along the reverse (internal) side segment of the length of secondary armrest front link vertical extender 56. FIG. 13C further illustrates the internal location of the indexing depressions 60. In an alternate aspect (not shown) the indexing depressions 60 may be through openings (e.g., "holes") that can be, for example, indexing through holes extending through the thickness of the vertical extender 56. FIG. 13B is an enlarged view of the proximal end of the secondary armrest front link 50b that further illustrates the secondary armrest front link proximal end flange recess 54c that is dimensioned and that is otherwise configured to receive the secondary armrest front link vertical extender 56. As is evident from at least FIGS. 12A, 12B, 13A, and 13C, according to present aspects where the secondary armrest assembly is configured to adjust to selected variable heights (e.g. variable heights with respect to the primary armrest location), the secondary armrest front link 50b comprises multiple components assembled to form the front link such that, for example, the secondary armrest front link proximal end flange 54a can be a component of the front link assembly that is in a movable configuration with the remainder of the secondary armrest front link features that can include, for example, the secondary armrest front link vertical extender 56 that can be integral with the secondary armrest front link second (e.g., lower) surface, for example.

FIG. 13C is a cross-sectional view of the secondary armrest front link proximal end flange 54a shown in FIG. 13B taken along line B-B, with the internal locking mechanism 62 shown engaging the secondary armrest front link vertical extender 56 housed within the secondary armrest front link proximal end flange recess 54c located within the secondary armrest front link proximal end flange 54a. As further shown in FIG. 13C, the indexing depressions 60 are configured to engage and otherwise come into direct physical and intimate contact with a component (e.g., a locking mechanism ball 61) of a locking mechanism 62 that translates an applied outward force to engage the indexing depression 60. As further shown in FIG. 13C, the locking mechanism 62 can be retained within a chamber 64 located within a section of the secondary armrest front link proximal flange 54a, and the locking mechanism 62 can be, for example, a ball-spring-grub screw type of mechanism comprising a spring component 68 in communication with a ball 61. While one end of the spring engages and provides an outward force linearly against ball 61, the other end of the spring can be in contact with an end of the locking mechanism 61 such that a force can be translated from the ball and spring to, for example an integrated force sensor that can be in communication with or integral with, for example, an LED light 67 of a height indicator 66 such that, for example, the LED light 67 illuminates when a pre-calibrated force is delivered by the spring and received by the pressure sensor, indicating that the locking mechanism is in a fully engaged position adequate to support the weight of a passenger's arm, etc., and/or at a selected height.

FIG. 13C further shows a portion of the secondary armrest front link vertical extender 56 having indexing depressions 60 spaced along the vertical length, with the indexing depressions 60 configured to engage the ball 61 of the locking mechanism 66. Vertical extender 56 is shown in position within the secondary armrest front link proximal end flange recess 54c with secondary armrest front link proximal end flange recess wall 54d visible bounding the length of the secondary armrest front link proximal end flange recess 54c.

FIGS. 14A, 14B, 14C, 15A, 15B, 15C, 15D, 15E, 16A, 16B, 16C show further features of secondary armrest front link length extenders and secondary armrest front link length extender assemblies that are contemplated as being incorporated into the secondary armrest assemblies presently contemplated according to present aspects, and that can be of the type shown in FIGS. 11B and 12B, for example.

According to a present aspect, a secondary armrest assembly 23 of the type shown, for example FIGS. 11B and 12B, can include a secondary armrest front link 50a or 50c, respectively, that incorporates or is otherwise modified to incorporate an integrated front link length extender. More specifically, FIGS. 14A, 14B, 14C show an alternate aspect for forming a secondary armrest front link having a length extender. FIG. 14A shows a length extender 70 of the type that can be incorporated into a secondary armrest assembly 23 comprising a secondary armrest front link 50a, 50b, 50c (as shown in FIGS. 11B, 12A, 12B). FIGS. 14A, 14B, and 14C further show views of a secondary armrest front link extender 70 (referred to equivalently herein as a "front link extender").

FIG. 14A shows a perspective and slightly elevated view of view of a secondary armrest front link length extender 70 comprising a secondary armrest front link length extender proximal end 70a, a secondary armrest front link length extender distal end 70b, a secondary armrest front link length extender first side 72 (e.g. upper surface as shown), and a secondary armrest front link length extender second side 74 (e.g., lower surface as shown). At the secondary armrest front link length extender proximal end 70a, secondary armrest front link length extender 70 further comprises an extender retaining projection 76 shown in FIG. 14A as a linear protrusion extending longitudinally a selected distance from the secondary armrest front link length extender proximal end 70a toward the secondary armrest front link length extender distal end 70b. The length extender retaining projection 76 can be configured and otherwise dimensioned along its length to incorporate flanges such that the extender retaining projection 76 is configured to engage, for example, a complimentary channel located in the secondary armrest front link such that the extender retaining projection 76 can slidably move a selected distance longitudinally along the length of the secondary armrest front link, and selectively extending the armrest length of the secondary armrest assembly.

FIG. 14B is an overhead plan view of the secondary armrest front link extender 70 of the type shown in 14A, with FIG. 14C provided to show a side view of the secondary armrest front link length extender 70 of the type shown in FIGS. 14A and 14B.

FIGS. 15A, 15B, 15C, and 15D show views of the secondary armrest front link 80 that is similar to the type shown as part 50c in FIG. 12B, with the secondary armrest front link 80 configured to incorporate the secondary armrest vertical extender 56 that is configured to extend vertically, for example, into the secondary armrest front link proximal end flange recess 54c, as shown at least in FIG. 12B.

FIG. 15A shows an elevated perspective view of a secondary armrest front link similar to the secondary armrest front links shown in the FIGS., but without the secondary armrest front link proximal end flange 54a shown in FIGS. 8, 9, 10, 11A, 11B, 12A, 12B. As shown in FIG. 15A, secondary armrest front link 80 comprises a secondary armrest front link proximal end 80a, a secondary armrest front link distal end 80b, a secondary armrest front link first side 82 (e.g. upper surface as shown), and a secondary armrest front link second side 84 (e.g., lower surface as shown). At the secondary armrest front link proximal end 80a, secondary armrest front link 80 further comprises a secondary armrest front link retaining channel 86 that is shown in FIG. 15A as a linear depression or channel extending longitudinally a selected distance from the secondary armrest front link proximal end 80a toward the secondary armrest front link distal end 80b. The secondary armrest front link retaining channel 86 is dimensioned and otherwise configured to receive and engage (e.g., "mate" with, etc.) the extender retaining projection 76 of the length extender 70 shown in FIGS. 14A, 14B, 14C. The secondary armrest front link retaining channel 86 is configured to be a dimensionally complimentary channel located in the secondary armrest front link 80 such that the extender retaining projection 76 can mate with the retaining channel 86 such that the length extender 70 itself can mate with the front link 80, and such that the secondary armrest front link length extender 70 can slidably move a selected distance longitudinally along the length of the secondary armrest front link 80, to selectively extend the armrest length of the secondary armrest assembly to a selected distance that can be greater than the length of the secondary armrest front link 80 itself.

FIG. 15B is a cutaway, cross-sectional and enlarged proximal end view of the secondary armrest front link 80 taken along line C-C as shown in FIG. 15A. As shown in FIG. 15B, secondary armrest front link proximal end 80a of secondary armrest front link 80 shows the retaining channel 86 present and contiguous with the secondary armrest front link first side 82, with retaining channel 86 comprising and defined by retaining channel walls 86a and retaining channel floor 86b.

FIG. 15C is an overhead plan view of the secondary armrest front link 80 further showing the secondary armrest front link first side 82 and the retaining channel 86 positioned near the secondary armrest front link proximal end 80a that is in contact with secondary armrest front link vertical extender 56 that is dimensioned and otherwise configured to be received into a secondary armrest front link proximal end flange (not shown in FIGS. 15A-15D), with the secondary armrest front link vertical extender 56 being integral with the front link 80. In alternate aspects, the vertical extender 56 can be a separate component that is fixedly attached to the front link 80, for example.

FIG. 15D is a side view of the secondary armrest front link 80 shown in FIGS. 15A and 15C with the secondary armrest front link first and second surfaces 82, 84 (respectively) visible, along with the secondary armrest front link vertical extender 56. FIG. 15E is an end view of the secondary armrest front link proximal end 80a of the secondary armrest front link 80, further showing an end view of the secondary armrest front link vertical extender that can be integral with the front link.

FIGS. 16A-16C show the secondary armrest front link as an assembly comprising the secondary armrest front link length extender 70 in combination with the secondary armrest front link 80 to form a completed front link assembly with the functioning length extender that can selectively and on demand increase the length of the secondary armrest front link, as well as extend the length of the overall secondary armrest assembly 23 shown in the FIGS. at least in FIG. 10, when the secondary armrest assembly 23 is moved from a nested secondary armrest assembly stowed position beneath the primary armrest 20 of armrest assembly 18 to a secondary armrest assembly deployed position that is positioned substantially adjacent to the primary armrest 20 (as shown in FIGS. 11A, 11B, 12A, 12B, for example).

As shown in FIG. 16A, secondary armrest front link length extender 70 can be brought into engageable contact with secondary armrest front link 80 such that the secondary armrest front link length extender second side 74 is brought into contact with secondary armrest front link first side 82 and with extender retaining projection 76 engaged with and configured to mate with and within secondary armrest front link retaining channel 86. FIG. 16B shows the assembled secondary armrest front link 80 now comprising the movably, and slidably attached secondary armrest front link length extender 70.

FIG. 16C is a cutaway cross-sectional end view of the secondary armrest front link taken along line D-D. As shown in FIG. 16C, secondary armrest front link 80 with secondary armrest front link length extender 70 is in slidable and movable cooperative configuration such that the secondary armrest front link length extender second side 74 is in contact with secondary armrest front link first side 82 and with secondary armrest front link length extender retaining projection 76 configured to mate with and within the secondary armrest front link retaining channel 86. FIG. 16C further shows secondary armrest front link length extender retaining channel 86 comprising and otherwise defined by opposing secondary armrest front link retaining channel walls 86a and the secondary armrest front link retaining channel floor 86b.

The secondary armrest front link assemblies shown in FIGS. 14A-14C, 15A-15E, and 16A-16C are also directed to aspects for constructing a secondary armrest assembly front link fitted with and otherwise comprising the secondary armrest front link length extender alone (not shown in the listed FIGS. in this paragraph), or for constructing the secondary armrest front link that is fitted with and otherwise comprises both the length extender and the secondary armrest front link vertical extender, as shown in the FIGS.

FIGS. 17, 18, 19 and 20 are flowcharts outlining methods according to further present aspects employing the apparatuses, systems, assemblies, sub-assemblies disclosed and described at least in FIGS. 1-10, 11A, 11B, 12A, 12B, 13A-13C, 14A-14C, 15A-15E, and 16A-16C. FIG. 17 is a flowchart outlining a method 1300 for installing an armrest assembly into a seat assembly, according to present aspects, with the method 1300 comprising providing 1302 a seat assembly comprising a seat assembly frame, with the seat assembly frame configured to support a plurality of seats, and attaching 1304 an armrest assembly to the seat assembly frame, with the armrest assembly comprising a secondary armrest front link, with the secondary armrest front link comprising a secondary armrest front link first surface (e.g., secondary armrest front link upper surface) and a secondary armrest front link second surface (e.g., secondary armrest front link lower surface), with the secondary armrest front link including a secondary armrest front link proximal end and a secondary armrest front link distal end, and with the secondary armrest front link proximal end comprising a secondary armrest front link proximal end flange, and with the secondary armrest front link proximal end flange comprising a secondary armrest front link proximal end flange through opening. The secondary armrest assembly further includes a secondary armrest intermediate link, with the secondary armrest intermediate link including a secondary armrest intermediate link proximal end and a secondary armrest intermediate link distal end, with the secondary armrest intermediate link distal end including an secondary armrest intermediate link distal end flange configured to movably engage the secondary armrest front link proximal end flange, wherein the secondary armrest assembly is attached to the seat frame via an armrest assembly end link, with the armrest assembly end link comprising an armrest assembly end link proximal end and an armrest assembly end link distal end, with the armrest assembly end link distal end configured to movably engage the secondary armrest intermediate link proximal end flange, and with the armrest assembly end link proximal end configured to engage a seat assembly component that can be, for example, a seat frame.

In another present aspect, FIG. 18 is a flowchart illustrating a presently disclosed method 1400 that further comprises attaching 1402 a primary armrest assembly to the armrest assembly vis the armrest assembly end link, with the primary armrest assembly comprising a primary armrest assembly first surface (e.g., a primary armrest assembly upper surface) and a primary armrest assembly second surface (e.g., a primary armrest assembly lower surface), with the primary armrest assembly comprising a primary armrest proximal end and a primary armrest distal end, and with the primary armrest distal end configured to engage the armrest assembly end link.

In a further present aspect, FIG. 19 is a flowchart illustrating a presently disclosed method 1500 further comprising nesting 1502 the secondary armrest assembly beneath the primary armrest assembly in a secondary armrest assembly stowed configuration.

In yet another present aspect, FIG. 20 is a flowchart outlining a presently disclosed method 1600 for installing a seat assembly into a passenger aircraft, with the method comprising installing 1602 a seat assembly into a passenger vehicle, with the seat assembly comprising an armrest assembly, and with the armrest assembly comprising a primary armrest assembly. The primary armrest assembly includes a primary armrest assembly first (upper) surface and a primary armrest second (lower) surface, with the primary armrest comprising a primary armrest proximal end and a primary armrest distal end. The armrest assembly further comprises a secondary armrest assembly, with the secondary armrest assembly comprising a secondary armrest front link, with the secondary armrest front link comprising a secondary armrest front link first (upper) surface and a secondary armrest front link second (lower) surface. The secondary armrest front link comprises a secondary armrest front link proximal end and a secondary armrest front link distal end, with the secondary armrest front link proximal end comprising a secondary armrest front link proximal end flange, with the secondary armrest front link proximal end flange comprising a secondary armrest front link proximal end flange through opening, and with the secondary armrest assembly further comprising an intermediate link. The secondary armrest intermediate link comprises a secondary armrest intermediate link proximal end and a secondary armrest intermediate link distal end, with the secondary armrest intermediate link distal end comprising a secondary intermediate link distal end flange configured to movably engage the secondary armrest front link proximal end flange. The secondary armrest assembly further comprises an armrest assembly end link, with the armrest assembly end link comprising an armrest assembly end link proximal end and an armrest assembly end link distal end, with the armrest assembly end link distal end configured to movably engage the secondary armrest intermediate link proximal end flange, and with the armrest assembly end link proximal end configured to engage a seat frame.

The present aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed is:

1. An armrest assembly comprising:
   a primary armrest assembly, said primary armrest assembly comprising:
      a primary armrest first surface and a primary armrest second surface, said primary armrest assembly further comprising a primary armrest proximal end and a primary armrest distal end, said primary armrest proximal end in communication with a seat assembly;
   a secondary armrest assembly, said secondary armrest assembly comprising:
      a secondary armrest front link, said secondary armrest front link comprising a secondary armrest front link first surface, a secondary armrest front link second surface, a secondary armrest front link proximal end and a secondary armrest front link distal end, said secondary armrest front link proximal end comprising a secondary armrest front link proximal end flange, said secondary armrest front link proximal end flange comprising a secondary armrest front link proximal end flange through opening;
      a secondary armrest intermediate link, said secondary armrest intermediate link comprising a secondary armrest intermediate link proximal end comprising a secondary armrest intermediate proximal end flange, and a secondary armrest intermediate link distal end, said secondary armrest intermediate link distal end comprising at least one intermediate link distal end flange configured to movably and pivotably engage the secondary armrest front link proximal end flange; and
      an armrest assembly end link, said armrest assembly end link comprising an armrest assembly end link proximal end comprising an armrest assembly end link proximal end flange, said armrest assembly end link further comprising an armrest assembly end link distal end comprising an armrest assembly end link distal end flange, said armrest assembly end link distal end configured to movably and pivotable engage the secondary armrest intermediate link proximal end flange, said armrest assembly end link proximal end configured to engage the seat assembly.

2. The armrest assembly of claim 1, wherein the secondary armrest assembly is configured to move from a secondary armrest assembly stowed position immediately beneath the primary armrest assembly to a secondary armrest assembly deployed position laterally adjacent to the primary armrest assembly.

3. The armrest assembly of claim 2, wherein the secondary armrest assembly in the secondary armrest assembly stowed position is configured to movably nest beneath the primary armrest assembly.

4. The armrest assembly of claim 2, wherein the secondary armrest front link first surface comprises a secondary armrest cushion layer first section, said secondary armrest intermediate link comprises a secondary armrest cushion layer second section, and said primary armrest first surface comprises a primary armrest assembly cushion layer.

5. The armrest assembly of claim 2, wherein, in the secondary armrest assembly deployed position, the secondary armrest front link is positioned at a secondary armrest front link average height, said secondary armrest front link average height varying from a primary armrest assembly average height.

6. The armrest assembly of claim 1, wherein the secondary armrest assembly further comprises a secondary armrest front link extender, said secondary armrest front link extender configured to extend to a selected extended distance outwardly from the secondary armrest front link distal end.

7. The armrest assembly of claim 1, wherein the primary armrest assembly has a first average width perpendicular to a primary armrest longitudinal axis, and the secondary armrest front link has a second average width perpendicular to a secondary armrest front link longitudinal axis, said first average width greater than or equal to the second average width.

8. The armrest assembly of claim 2 wherein the secondary armrest front link first surface comprises a secondary armrest front link first surface area, and wherein the entirety of said secondary armrest front link first surface area is exposed in the secondary armrest assembly deployed position.

9. The armrest assembly of claim 1, wherein said secondary armrest intermediate link proximal end flange is configured to movably engage with the armrest assembly end link distal end, said secondary armrest intermediate link configured to movably pivot about the armrest assembly end link distal end.

10. The armrest assembly of claim 1, wherein the secondary armrest front link proximal end flange is configured to movably engage with the secondary armrest intermediate link distal end, said secondary armrest front link proximal end flange further configured to movably pivot about the secondary armrest intermediate link distal end.

11. A seat assembly comprising the armrest assembly of claim 1.

12. A passenger vehicle comprising the armrest assembly of claim 1.

13. The passenger vehicle of claim 12, wherein the passenger vehicle is selected from the group consisting of:
   a crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle; a crewed surface water borne vehicle, an uncrewed waterborne vehicle, a crewed sub-surface water borne vehicle, an uncrewed sub-surface water borne vehicle, a satellite, and combinations thereof.

14. An aircraft comprising the armrest assembly of claim 1.

15. The armrest assembly of claim 1, said secondary armrest assembly in communication with the armrest assembly end link, said armrest assembly end link proximal end configured to engage a seat frame.

16. A method for installing a seat assembly into a passenger vehicle, said method comprising:
   installing a seat assembly into a passenger vehicle, said seat assembly comprising an armrest assembly, said armrest assembly comprising:
      a primary armrest assembly, said primary armrest assembly comprising a primary armrest assembly first surface and a primary armrest assembly second surface, said primary armrest assembly further comprising a primary armrest proximal end and a primary armrest distal end;

a secondary armrest assembly, said secondary armrest assembly comprising a secondary armrest front link, said secondary armrest front link comprising a secondary armrest front link first surface and a secondary armrest front link second surface, said secondary armrest front link further comprising a secondary armrest front link proximal end and a secondary armrest front link distal end, said secondary armrest front link proximal end comprising a secondary armrest front link proximal end flange, said secondary armrest front link proximal end flange comprising a secondary armrest front link proximal end flange through opening, said secondary armrest assembly further comprising:

- a secondary armrest intermediate link, said secondary armrest intermediate link comprising a secondary armrest intermediate link proximal end and a secondary armrest intermediate link distal end, said secondary armrest intermediate link distal end comprising a secondary armrest intermediate link distal end flange configured to movably engage the secondary armrest front link proximal end flange; and an armrest assembly end link, said armrest assembly end link comprising an armrest assembly end link proximal end and an armrest assembly end link distal end, said armrest assembly end link distal end configured to movably engage the secondary armrest intermediate link proximal end flange, said armrest assembly end link proximal end configured to engage at least one of the seat assembly and a seat frame.

17. The method of claim 16, further comprising:
attaching the primary armrest assembly to the armrest assembly end link.

18. The method of claim 16, further comprising:
nesting the secondary armrest assembly beneath the primary armrest assembly in a secondary armrest assembly stowed configuration.

19. The method of claim 16, wherein the passenger vehicle is selected from the group consisting of:
a crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle; a crewed surface water borne vehicle, an uncrewed waterborne vehicle, a crewed sub-surface water borne vehicle, an uncrewed sub-surface water borne vehicle, a satellite, and combinations thereof.

20. The method of claim 16, wherein the passenger vehicle is an aircraft.

* * * * *